United States Patent
Onodera

(10) Patent No.: US 7,760,262 B2
(45) Date of Patent: Jul. 20, 2010

(54) METHOD FOR SOLID-STATE IMAGING DEVICE WITH OVERLAPPING SIGNAL CHARGE TRANSFER PROCESSES

(75) Inventor: Tatsuo Onodera, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 316 days.

(21) Appl. No.: 11/882,304

(22) Filed: Jul. 31, 2007

(65) Prior Publication Data

US 2008/0252766 A1    Oct. 16, 2008

(30) Foreign Application Priority Data

Aug. 8, 2006  (JP) .......................... P2006-215680

(51) Int. Cl.
    *H04N 5/335*    (2006.01)
(52) U.S. Cl. ..................... 348/311; 348/312
(58) Field of Classification Search ................ 348/315, 348/316, 319, 324
    See application file for complete search history.

(56) References Cited

U.S. PATENT DOCUMENTS 5,182,648 A * 1/1993 Hirota ..................... 348/311
6,075,565 A * 6/2000 Tanaka et al. ............ 348/312
6,118,481 A * 9/2000 Hamada ................... 348/220.1
7,187,411 B2 * 3/2007 Yamada .................... 348/314
2006/0164532 A1 * 7/2006 Ikeda ....................... 348/311

FOREIGN PATENT DOCUMENTS

JP    2002-112122 A    4/2002
JP    2002-185870 A    6/2002

* cited by examiner

*Primary Examiner*—Luong T Nguyen
(74) *Attorney, Agent, or Firm*—Birch, Stewart, Kolasch & Birch, LLP

(57) ABSTRACT

A first transfer process for transferring signal charges in a vertical direction on vertical transfer sections, a second transfer process for transferring signal charges received from outputs of the vertical transfer sections from line memory to a horizontal transfer section, and a third transfer process for transferring signal charges in a horizontal direction on the horizontal transfer section are controlled at predetermined timings, and the timings are controlled such that at least part of a second time period T21 during which the second transfer process is implemented overlaps a first time period during which the first transfer process is implemented. A time t12 at which the second time period T21 is over is set to occur before a charge receiving potential is applied to a final charge transfer electrode for the vertical charge transfer sections.

1 Claim, 14 Drawing Sheets

METHOD FOR SOLID-STATE IMAGING DEVICE WITH OVERLAPPING SIGNAL CHARGE TRANSFER PROCESSES

CROSS-REFERENCE TO RELATED APPLICATIONS

This application is based upon and claims the benefit of priority from the Japanese Patent Application No. 2006-215680 filed on Aug. 8, 2006; the entire contents of which are incorporated herein by reference.

BACKGROUND OF THE INVENTION

1. Technical Field

The invention relates to a method for driving a solid-state imaging device which comprises a photoelectric conversion section made up by arranging two-dimensionally a plurality of photoelectric conversion elements, a horizontal transfer section and a line memory interposed between the vertical transfer sections and the horizontal transfer section.

2. Description of the Related Art

In a solid-state imaging device adopted in an apparatus such as a digital camera, in order to detect an image of a subject at each of two-dimensional image pixels, a large number of photoelectric conversion elements (generally, photodiodes) are disposed in positions of respective intersection points or positions of spaces in a square lattice pattern in a row direction and a column direction so as to be arranged into a two-dimensional arrangement. In addition, in order to sense a color image, in general, a plurality of photoelectric conversion elements which are associated with respective colors of R, G, B are arranged two-dimensionally on a regular basis according to a specific arrangement pattern such as a Bayer arrangement.

In general, signals which are read out of respective photoelectric conversion elements of the solid-state imaging device are transferred sequentially in the column direction (the vertical direction) via vertical charge transfer sections (VCCDs) and are, thereafter, transferred in the row direction (the horizontal direction) via a horizontal charge transfer section (HCCD), whereby signal charges of the photoelectric conversion elements aligned in the horizontal direction are processed sequentially line by line. In addition, a line memory for holding signals of all the pixels of one horizontal line is interposed between the vertical charge transfer sections and the horizontal charge transfer section. Then, signal charges output from the vertical charge transfer sections are temporarily stored in the line memory, and after having been transferred from the line memory to the horizontal charge transfer section, the signal charges are transferred in the horizontal direction over the horizontal charge transfer section. JP 2002-112122 A (corresponding to U.S. Pat. No. 7,187,411) and JP 2002-185870 A relates to the solid-state imaging device configured as has been described above.

When attempting to drive the solid-state imaging device configured as has been described above, after signal charges read out of the respective photoelectric conversion elements have been transferred to the vertical charge transfer sections (VCCDs). The signal charges are transferred in a vertical direction on the vertical charge transfer sections. The signal charges are passed over to the line memory from outputs of the vertical charge transfer sections. Thereafter, the signal charges on the line memory are transferred to the horizontal charge transfer section (HCCD). Furthermore, the signal charges are transferred sequentially pixel by pixel in the horizontal direction over the horizontal charge transfer section.

SUMMARY OF THE INVENTION

FIG. 14 shows one example of transfer timings of the signal charges. As shown in FIG. 14, firstly, with the operation of the line memory and the operation of the horizontal chare transfer section stopped, only the vertical charge transfer sections are driven, so that the signal charges on the vertical charge transfer sections are transferred in the vertical direction (a vertical transfer time period T1). After the transfer operation of the vertical charge transfer sections has been completed, the signal charges held on the line memory are transferred to the horizontal charge transfer section (an LM transfer time period T2). Thereafter, only the horizontal charge transfer section is driven so as to transfer the signal charges on the horizontal charge transfer section are transferred in the horizontal direction (a horizontal transfer time period T3). By repeating these operations, the signal charges of all the pixels of a frame can be read out.

Incidentally, in solid-state imaging devices which are used in digital cameras developed and sold in these days, in order to achieve a high resolution by increasing the number of pixels, the number of photoelectric conversion elements to be installed on the image sensing device is increased to a very high level. In the solid-state imaging device like this, since a large number of photoelectric conversion elements need to be read out sequentially, there is a tendency that a required time to read out all the pixels of one frame becomes long. Consequently, when sensing images continuously over a plurality of frames, there is imposed a limitation on the frame rate or the number of frames to be sensed per predetermined time period. Because of this, there is a demand for reduction in the time required to read out signal charges.

However, if the control shown in FIG. 14 is performed, the horizontal charge transfer section cannot implement the horizontal transfer of the signal charges during the relatively long horizontal transfer blanking time period T4 which includes the vertical transfer time period T1 and the LM transfer time period T2. The control shown in FIG. 14 requires to take a time period which is the sum of the horizontal transfer blanking time period T4 and the horizontal transfer time period T3 when reading out the signal charges for all the pixels of one line. Therefore, it is difficult to increase the frame rate.

The invention has been made in view of the above, and provides a method for driving a semiconductor image sensing device which can increase the frame rate higher than that obtained by the technologies, for example, shown in FIG. 14, by devising the contents of the control without modifying the construction of the solid-state imaging device itself.

(1) According to an aspect of the invention, a solid-state imaging device includes a photoelectric conversion section, a plurality of vertical transfer sections, a line memory and a horizontal transfer section. The photoelectric conversion section is configured by arranging two-dimensionally a plurality of photoelectric conversion elements in a row direction and a column direction. The vertical transfer sections transfer, in the column direction, signal charges output from the photoelectric conversion elements which are arranged in the column direction. The line memory is provided at final charge transfer stages of the respective vertical transfer sections. The line memory temporarily holds the signal charges. The horizontal transfer section transfers, in the row direction, the signal charges output from the line memory. A method for driving the solid-state imaging device includes: performing a first transfer process of transferring the signal charges in the column direction on the vertical transfer sections, at a first timing; performing a second transfer process of transferring the signal charges output from the vertical transfer sections to the horizontal transfer section through the line memory, at a second timing; performing a third transfer process of transferring the signal charges in the row direction on the horizontal transfer section, at a third timing; and controlling the first to third timings so that at least a part of a second period during which the second transfer process is performed overlaps a first period during which the first transfer process is performed.

According to this method for driving the solid-state imaging device, since the first to third timings are controlled so that the at least part of the second period during which the second transfer process is performed overlaps the first period during which the first transfer process is performed, the horizontal transfer blanking time period can be shortened. Consequently, the readout time required for one line obtained by adding the horizontal transfer blanking time period and the horizontal transfer time period (corresponding to T3 in FIG. 14) is shortened. Thereby, the frame rate is improved.

(2) Also, in the method of (1), the second transfer process may be started before the first transfer process is started. The second transfer process may be completed before a first potential is applied to an electrode for the final charge transfer stages of the vertical transfer sections. The first potential is used for introducing the signal charges resulting from the first transfer process to the final charge transfer stages of the vertical transfer sections.

According to this method for driving the solid-state imaging device, the timings are controlled so that the second transfer process is started before the first transfer process is started and that the second transfer process is completed before the first potential for introducing the signal charges from the upstream to the final charge transfer stages of the vertical transfer sections is applied to the electrode for the final charge transfer stages. Therefore, the horizontal transfer blanking time period can be shortened, and signal charges in an upstream-side row can be prevented from being mixed with signal charges in a downstream-side row. Namely, since a flow of the signal charges in the upstream-side row is cut off by a potential barrier formed in the electrode for the final charge transfer stages of the vertical transfer sections before the first potential is applied to the electrode for the final charge transfer stages, the mixing of the signal charges between rows can be surely prevented in the electrode for the final charge transfer stages.

Namely, a problem that arises when the timing of the first transfer process overlaps the timing of the second transfer process is that there is a possibility that signal charges are mixed up between rows adjacent to each other. For example, when the second transfer process is performed at the timing of the final stage of the first transfer process, the signal charges held in the final charge transfer stages of the vertical transfer sections would be allowed to start leaking to the horizontal transfer section via the line memory at a breath. Therefore, the signal charges in the upstream-side row and the signal charges in the downstream-side row are allowed to be mixed with each other. (Here, a direction in which signal charges flow from the transfer source to the transfer destination is regarded as a flowing direction of the signal discharges. The transfer source is referred to as the upstream in the flowing direction of the signal charges, and the transfer destination is referred to as the downstream in the flowing direction of the signal charges.) According to the method of (2), a fast frame rate can be realized while preventing the mixture of signal charges in the way described above.

(3) In the method of (1), the second transfer process may be started after the first transfer process is started. The second transfer process may be completed before a first potential is applied to an electrode for the final charge transfer stages of the vertical transfer sections. The first potential is used for introducing the signal charges resulting from the first transfer process to the final charge transfer stages of the vertical transfer sections.

According to this method for driving the solid-state imaging device, the timings are controlled so that the second transfer process is started after the first transfer process is started, and that the second transfer process is completed before the first potential for introducing the signal charges from the upstream side is applied to the electrode for the final charge transfer stages of the vertical transfer sections. Therefore, the horizontal transfer blanking time period can be shortened. Also, the signal charges of the upstream-side row and the signal charges of the downstream-side row can be prevented from being mixed with each other. Thereby, a fast frame rate can be realized while preventing the mixture of signal charges in the way described above.

(4) In the method of (1), the second transfer process may be started before the first transfer process is started. The second transfer process may be completed after a first potential is applied to an electrode for the first charge transfer stages of the vertical transfer sections and before a second potential is applied to an electrode of the line memory. The first potential is used for introducing the signal charges resulting from the first transfer process to the final charge transfer stages of the vertical transfer sections. The second potential is used for transferring the introduced signal charges to the horizontal transfer section.

According to this method for driving the solid-state imaging device, the second transfer process is started before the first transfer process is started, and the second transfer process is completed after the first potential for introducing the signal charges from the upstream side is applied to the electrode for the final charge transfer stages of the vertical transfer sections and before the second potential for transferring the introduced signal charges to the horizontal transfer section is applied. Therefore, the horizontal transfer blanking time period can be shortened. Also, the signal charges in the upstream-side row and the signal charges in the downstream-side row can be prevented from being mixed with each other. Thereby, a fast frame rate can be realized while preventing the mixture of signal charges in the way described above.

In addition, since the time period for the second transfer process can be made relatively long, signal charges can be prevented from being left. Namely, since the electrode for the final charge transfer stages of the vertical transfer sections and the electrode for controlling the transfer of the line memory are both formed broadly, it is inevitable that a relatively long time is taken to transfer the signal charges. Consequently, attempting to read out the signal charges at high speeds with a control signal having high frequency increases the possibility that all the signal charges cannot be transferred within the second time period during the second transfer process is performed and that some of the signal charges are left not transferred. Then, this method for driving the solid-state imaging device completes the second transfer process after the first potential for introducing the signal charges from the upstream side is applied to the electrode for the final charge transfer stages of the vertical transfer sections and before the second potential for transferring the introduced signal charges to the horizontal transfer section is applied. Therefore, the time period during which the second transfer process is performed can be made relatively long, to thereby make it possible to prevent the signal charges from being left not transferred.

In addition, when the first potential for introducing the signal charges from the upstream side is applied to the electrode for the final charge transfer stages of the vertical transfer sections, the signal charges from the upstream side come to flow in to the vicinity of the electrode for the final charge transfer stages of the vertical transfer sections. However, even in this state, if there exists a sufficient potential difference from the potential at the electrode for controlling the transfer of the line memory, the line memory constitutes a barrier. Thereby, the signal charges are prevented from flowing out from the final charge transfer stages of the vertical transfer sections to the horizontal transfer section.

(5) In the method of (1), the second transfer process may be started after the first transfer process is started. The second transfer process may be completed after a first potential is applied to an electrode for the first charge transfer stages of the vertical transfer sections and before a second potential is applied to an electrode of the line memory. The first potential is used for introducing the signal charges resulting from the first transfer process to the final charge transfer stages of the vertical transfer sections. The second potential is used for transferring the introduced signal charges to the horizontal transfer section.

According to this method for driving the solid-state imaging device, the second transfer process is started after the first transfer process is started, and the second transfer process is completed after the first potential for introducing the signal charges from the upstream side is applied to the electrode for the final charge transfer stages of the vertical transfer sections and before the second potential for transferring the introduced signal charges to the horizontal transfer section is applied. Therefore, the horizontal transfer blanking time period can be shortened, and the signal charges of the upstream-side line and the signal charges of the downstream-side line can be prevented from being mixed with each other, whereby a fast frame rate can be realized while preventing the mixture of signal charges in the way described above. In addition, since the time period during which the second transfer process is performed can be made relatively long, the charges can be prevented from being left not transferred.

According to the invention, the timings are controlled so at least a part of a second period during which the second transfer process is performed overlaps a first period during which the first transfer process is performed. Therefore, the horizontal transfer blanking time period can be made shortened. Consequently, the readout time required for a line obtained by adding the horizontal transfer blanking time period and the horizontal transfer time period is shortened, and the frame rate is improved. In addition, the configuration of the solid-state imaging device itself does not have to be modified.

BRIEF DESCRIPTION OF THE DRAWINGS

FIG. 10 is implemented.

DETAILED DESCRIPTION OF EMBODIMENTS OF THE INVENTION

First Embodiment

Hereinafter, a method for driving a solid-state imaging device according to exemplary embodiments of the invention will be described in detail with reference to the drawings.

Figure 1:
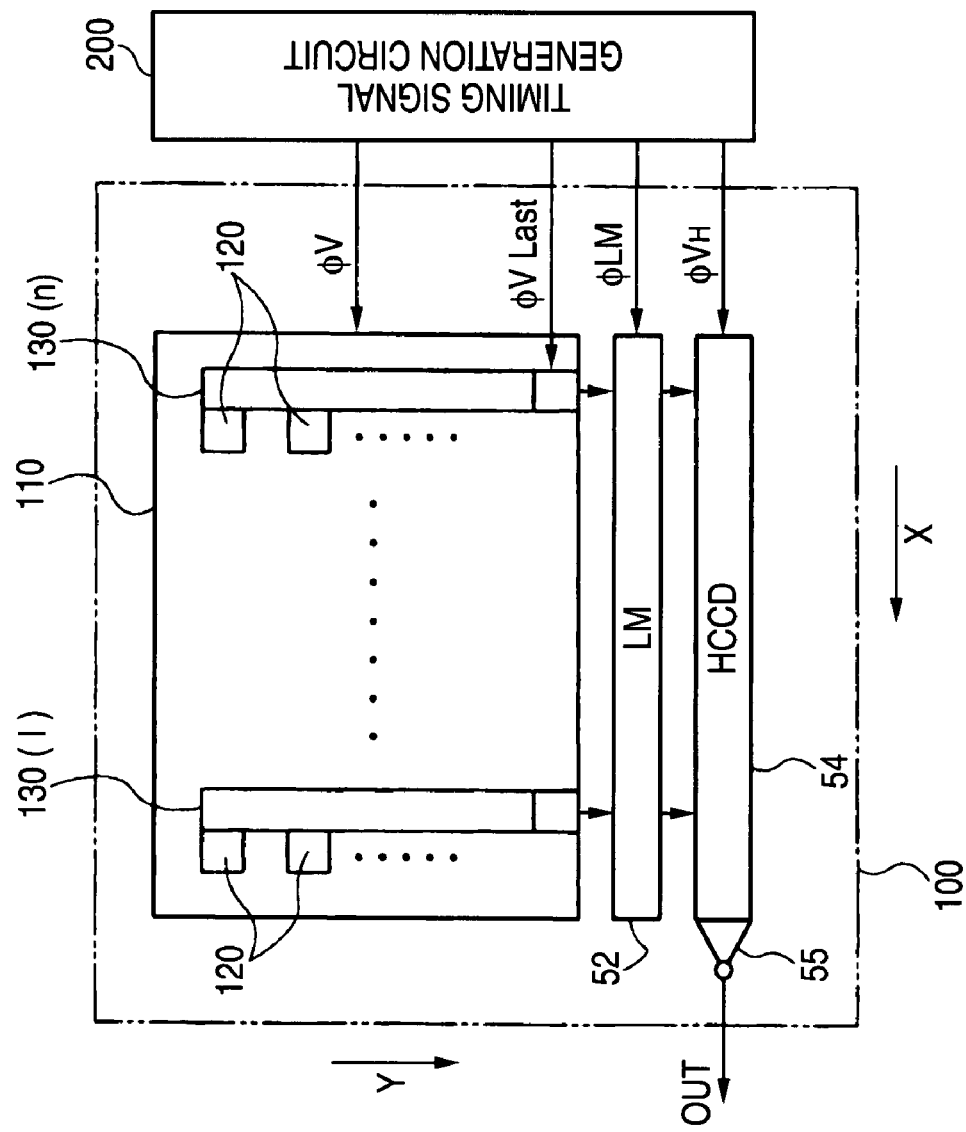
FIG. 1 is a block diagram showing the basic configuration of a solid state image sensing device.

FIG. 1 is a block diagram showing the basic configuration of a solid-state imaging device.

As shown in FIG. 1, a general solid-state imaging device 100 has an image sensing section 110 in which a large number of photoelectric conversion elements 120 are two-dimensionally arranged on a plane so as to be aligned along a row direction (a direction of an arrow X) and a column direction (a direction of an arrow Y). The respective photoelectric conversion elements 120 are normally photodiodes which are made up of semiconductors and generate signal charges according to amounts of light determined by the intensity and exposure time of light incident on respective light receiving surfaces thereof. Namely, amounts of signal charge generated by the respective photoelectric conversion elements 120 correspond to brightnesses of the respective pixels.

The solid-state imaging device 100 includes a plurality of vertical charge transfer sections (VCCDs) 130(1) to 130(n), a lime memory 52, a horizontal charge transfer section (HCCD) 54 and an output amplifier 55, so as to acquire signal charges output respectively by the large number of photodiodes 120 two-dimensionally arranged, according to a proper sequence from an output terminal OUT of the solid state image sensing as signals for each time series frame.

Each vertical charge transfer section 130 is provided in a position neighboring the photoelectric conversion elements 120 so as to extend in the Y direction. After having received signal charges from the respective photoelectric conversion elements 120 of one column, each vertical charge transfer section 130 transfers sequentially the signal charges received in the vertical direction (the Y direction), and this operation is performed column by column.

The line memory 52 is disposed on an output side of the vertical charge transfer sections 130(1) to 130(n). Signal charges for one row which are output from the vertical charge transfer sections 130(1) to 130(n) are temporarily stored in the line memory 52.

The signal charges for one row that are stored in the line memory 52 are transferred from the line memory 52 to the horizontal charge transfer section 54. As a result, the signal charges for one row are held in the horizontal charge transfer section 54. The horizontal charge transfer section 54 transfers sequentially the signal charges of one row, which are held therein, in the horizontal direction (the X direction) in units of pixel. The signal charges output from the horizontal charge transfer section 54 are amplified by the output amplifier 55 and are then sent to the output terminal OUT.

Control signals which are necessary to realize the readout operation that has been described above, that is, a vertical transfer control signal φV (normally, a signal having a plurality of phases), a transfer control signal φLM and a horizontal transfer control signal φH (normally, a signal having a plurality of phases) are generated, respectively, by a predetermined timing signal generation circuit 200, and are applied to the vertical charge transfer section 130, the line memory 52 and the horizontal charge transfer section 54, respectively.

Here, referring to FIGS. 2 to 5, a more specific configuration example of the solid-state imaging device 100 will be described below.

Figure 2:
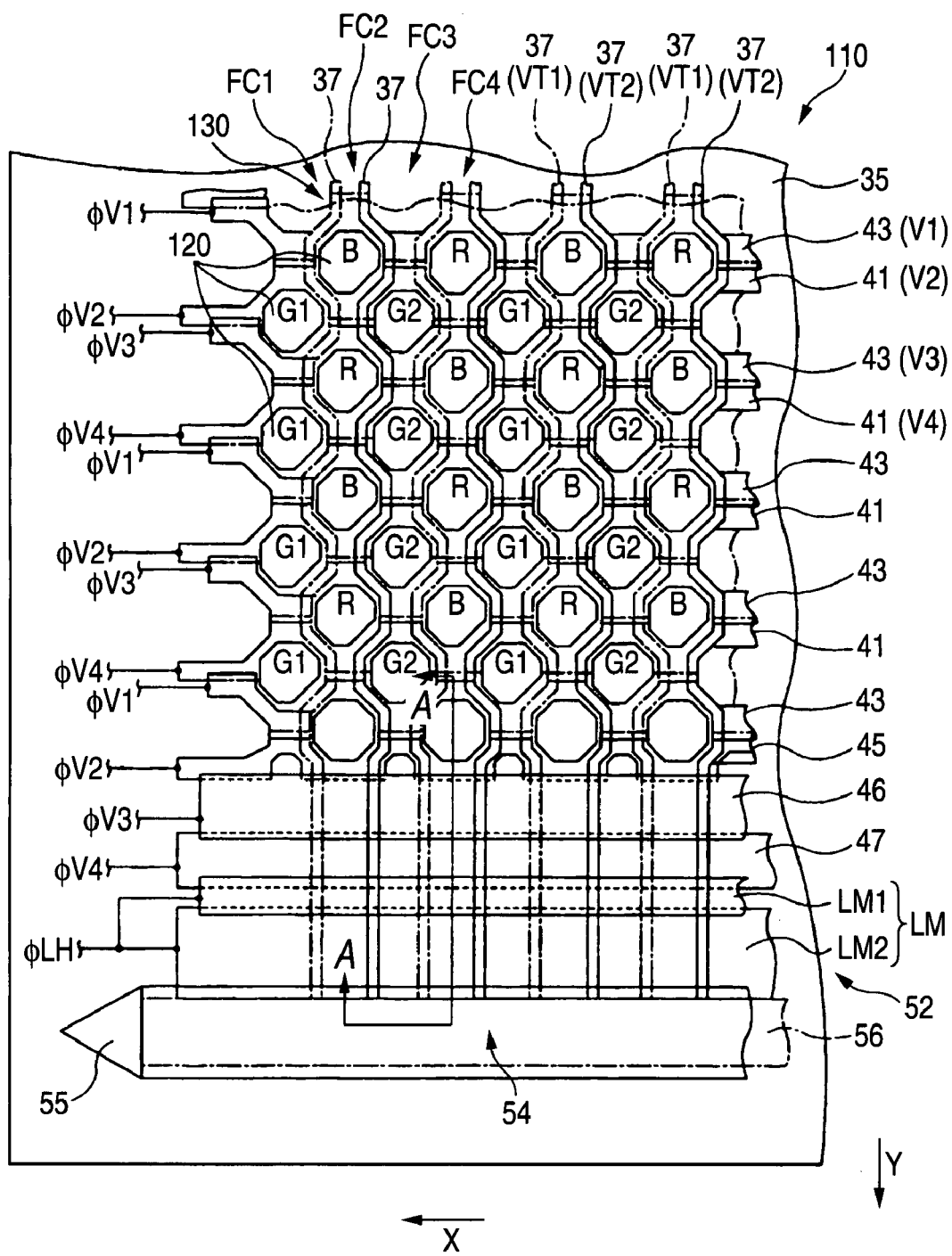
FIG. 2 is a plan view representing a realistic structure of a part of the solid-state imaging device.
Figure 3:
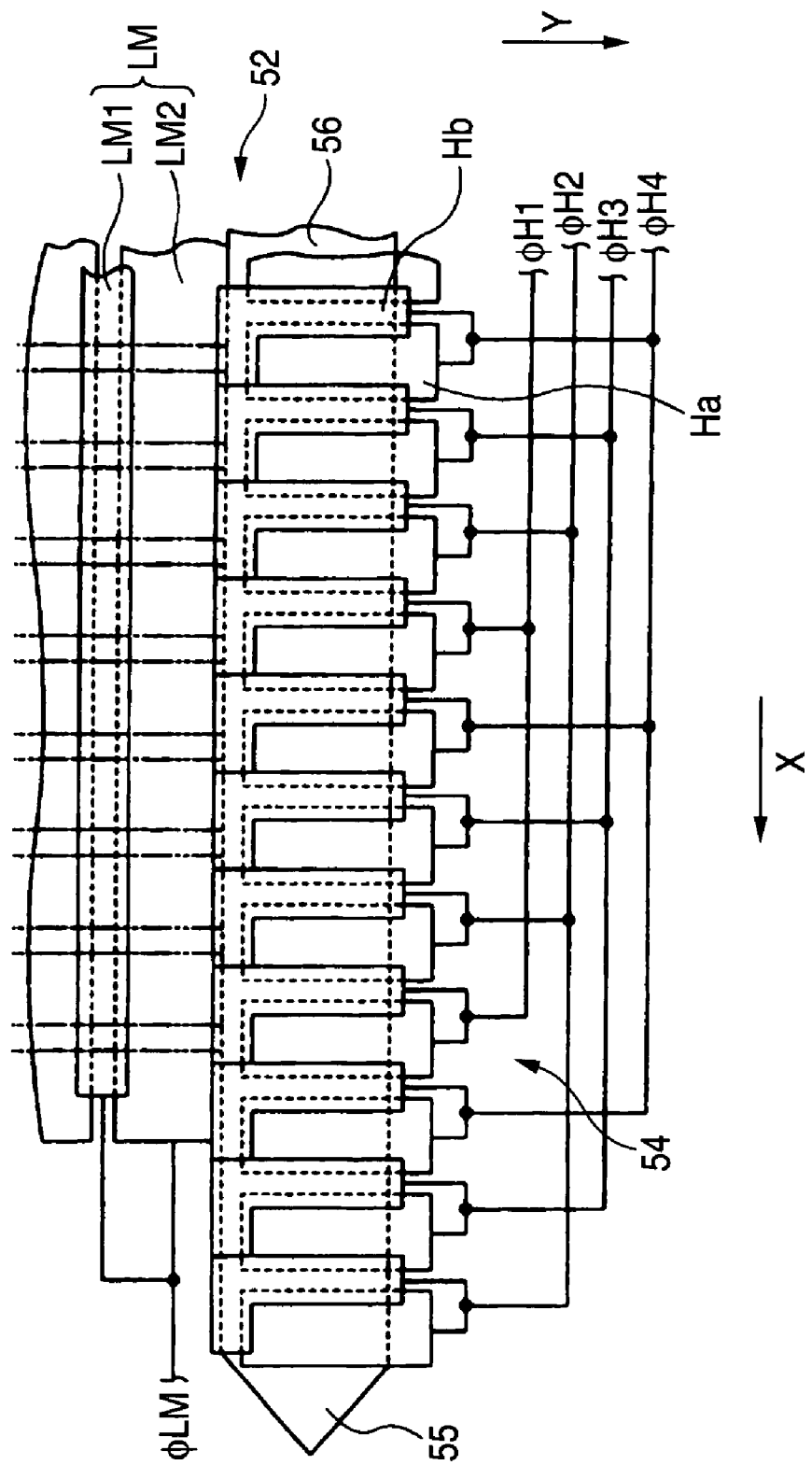
FIG. 3 is a partially enlarged plan view showing the detailed configuration of a horizontal charge transfer section of the solid-state imaging device shown in FIG. 2.
Figure 4:
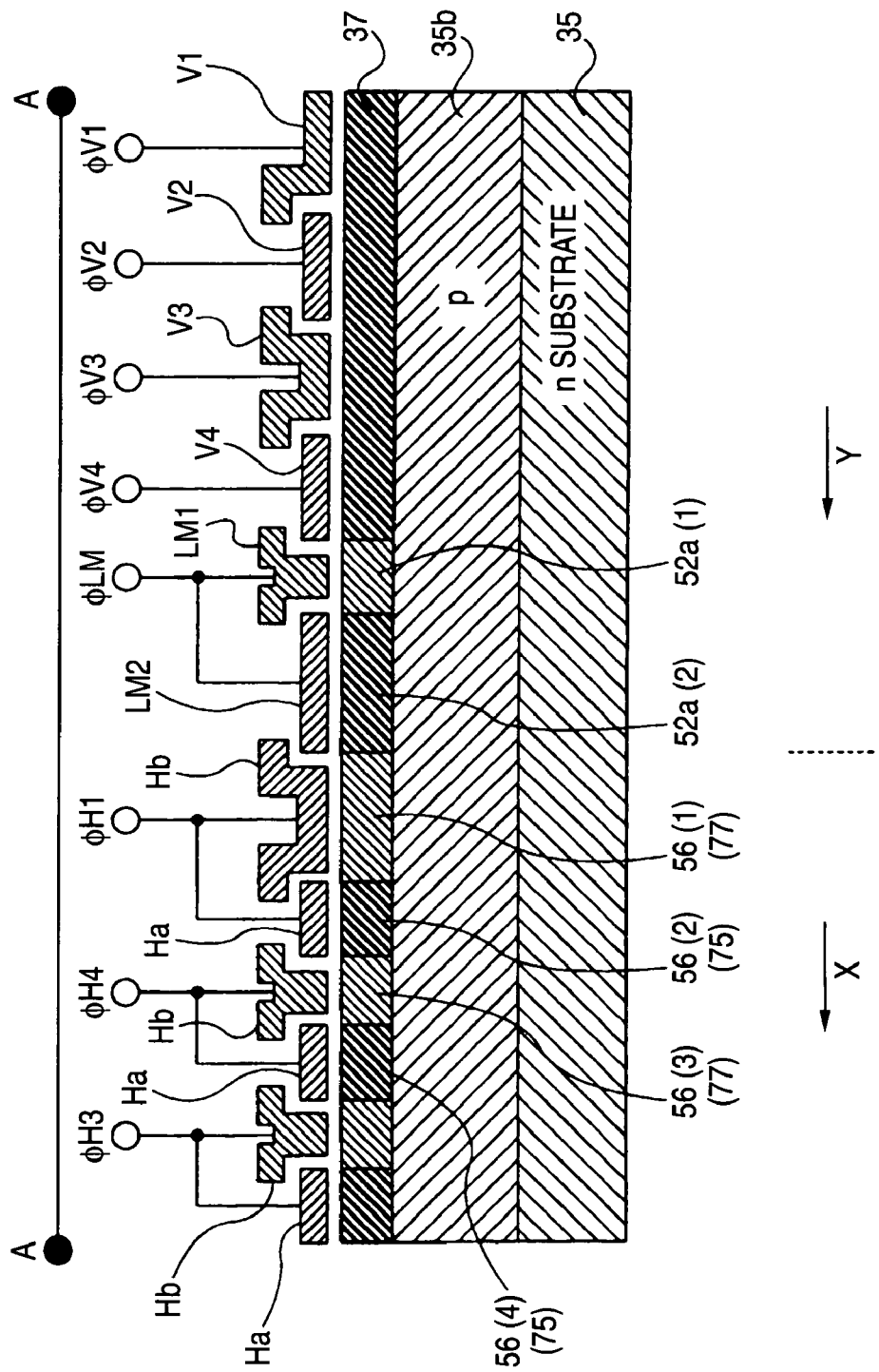
FIG. 4 is a section view taken along the line A-A of the solid-state imaging device shown in FIG. 2.
Figure 5:
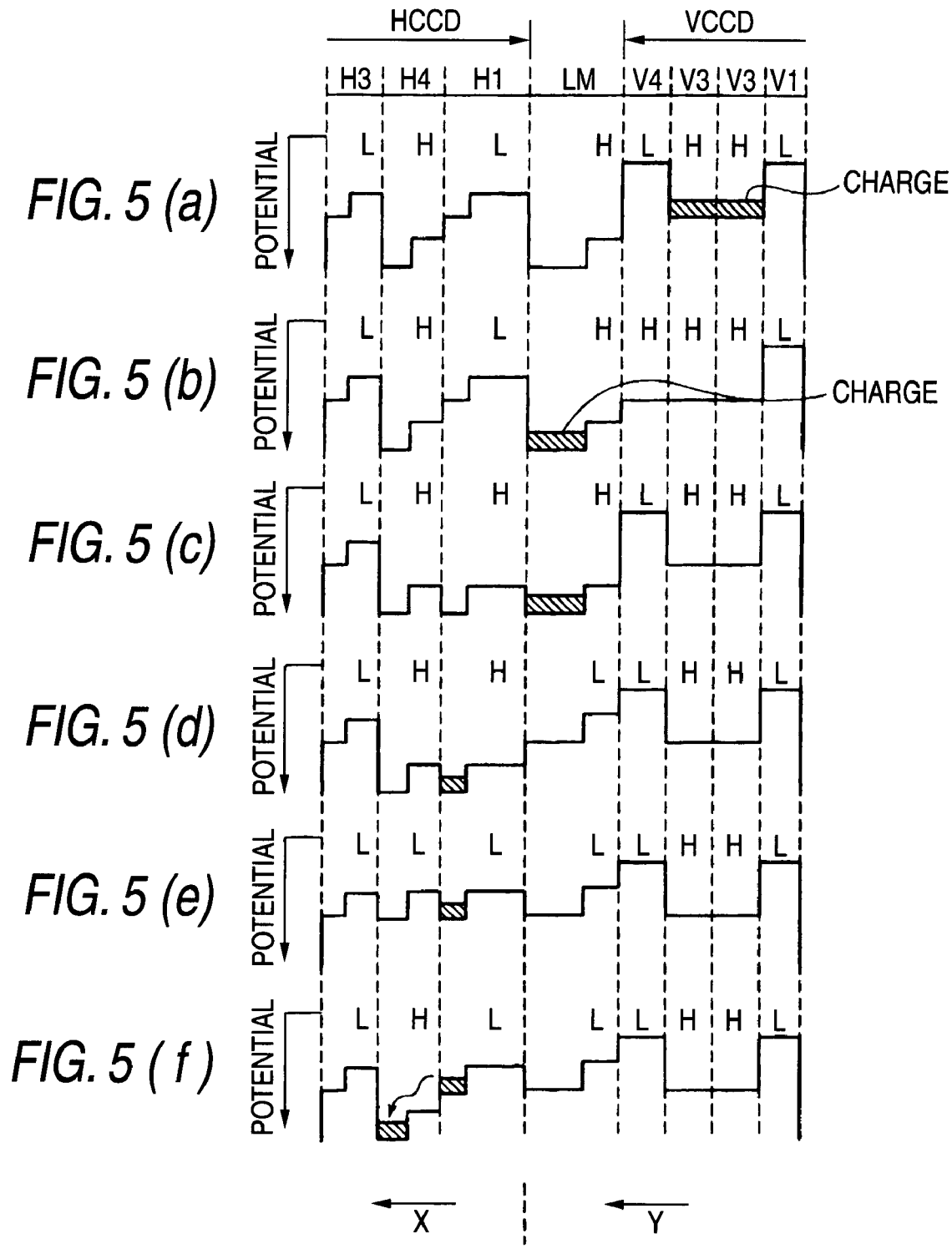
FIG. 5 is a state transition diagram representing signal charges transferred over the solid-state imaging device and state transitions of potential of respective sections thereof.

FIG. 2 is a plan view which represents partially the realistic configuration of the solid-state imaging device. FIG. 3 is a partially enlarged plan view which illustrates the detailed configuration of the horizontal charge transfer section of the solid-state imaging device shown in FIG. 2. FIG. 4 is a section view which represents a section of the solid-state imaging device shown in FIG. 2 taken along the line A-A. FIG. 5 is a state transition diagram which represents state transitions of signal charges transferred on the solid-state imaging device and potentials of respective portions.

In this example, as shown in FIG. 2, the large number of photoelectric conversion elements 120 are disposed so as to form a pattern in which the photoelectric conversion elements in one row are shifted by half of a pitch from the photoelectric conversion elements in the adjacent row (a so-called honeycomb array). In addition, it is assumed that the solid stage image sensing device 100 captures a color image. Therefore, as denoted by "G1," "G2," "B," and "R" in FIG. 2, color components that the respective photoelectric conversion elements 120 detects are determined in advance.

Namely, the respective photoelectric conversion elements 120 denoted by "G1" and "G2" detect the brightness of a color component of green, the respective photoelectric conversion elements 120 denoted by "B" detect the brightness of a color component of blue, and the respective photoelectric conversion elements 120 denoted by "R" detect the brightness of a color component of red.

In reality, a color component to be detected by each photoelectric conversion element 120 is determined by a spectral characteristic of an optical filter disposed on the front of a light receiving surface of each photoelectric conversion element 120. In the example shown in FIG. 2, four types of filter columns FC1, FC2, FC3 and FC4 are disposed with being divided for the respective columns of photoelectric conversion elements 120. Optical filters of the filter column FC1 are made up of green filters (G1) only, optical filters of the filter column FC2 are made up of blue filters (B) and red filters (R), optical filters of the filter column FC3 are made up of green filters (G2) only, and optical filters of the filter column FC4 are made up of red filters (R) and blue filters (B).

The respective photoelectric elements 120 in a column on which the filter column FC1 is disposed are made to detect the "G1," that is, color components of green. The respective photoelectric elements 120 in a column on which the filter column FC2 is disposed are made to detect color components of the "B" (blue) or "R" (red). The respective photoelectric elements 120 in a column on which the filter column FC3 is disposed are made to detect the "G2," that is, color components of green. The respective photoelectric elements 120 in a column on which the filter column FC4 is disposed are made to detect color components of the "R" (red) or "B" (blue).

As shown in FIG. 2, the vertical charge transfer section 130 is formed into a meandering shape for each column of the photoelectric conversion elements 120 in a position between each column and the adjacent column. The respective vertical charge transfer section 130 includes a vertical charge transfer channel 37 formed on a semiconductor substrate 35, a large number of first vertical transfer electrodes 41 and second vertical transfer electrodes 43, a first auxiliary transfer electrode 45, a second auxiliary transfer electrode 46 and a third auxiliary transfer electrode 47, which are all disposed on the semiconductor substrate 35 via an electrically insulating membrane (not shown).

Namely, a predetermined potential distribution is formed on the respective vertical charge transfer channel 37 by applying predetermined voltages to the respective electrodes (41, 43, 45, 46, 47). By switching sequentially the voltages applied to the respective electrodes, signal charges of the respective pixels in the vertical charge transfer section (VCCD) 130 can sequentially be transferred in a target direction.

The vertical transfer electrode 41 and the second vertical transfer electrode 43 are formed for each row of the photoelectric conversion elements 120. In addition, each respective vertical transfer electrode 41 also functions as a readout gate for controlling the transfer of the signal charges from the photoelectric conversion elements 120 to the vertical charge transfer channel 37 of the vertical charge transfer section 130.

As shown in FIG. 2, any of four-phase vertical transfer control signals (or, referred to as driving pulses) φV1, φV2, φV3, and φV4 is applied to the respective second vertical transfer electrodes 43 and first vertical transfer electrodes 41 which are aligned alternately in the direction indicated by the arrow Y according to a positional relationship between the second vertical transfer electrode 43 and the first vertical transfer electrode 41. Similarly, the vertical transfer control signal φV2 is applied to the first auxiliary transfer electrode 45, the vertical transfer control signal φV3 is applied to the second auxiliary transfer electrode 46, and the vertical transfer control signal φV4 is applied to the third auxiliary transfer electrode 47.

The line memory 52 is formed in a position (a downstream side of the transfer direction of the signal charges) adjacent to the electrode (47) which controls signal charges in the position (a lower side of FIG. 2) of the final charge transfer stage of the respective vertical charge transfer sections 130. Transfer control electrodes LM1 and LM2 are provided for controlling the transfer of the signal charges in the line memory 52. A transfer control signal φLM is applied to the transfer control electrodes LM1 and LM2.

The configuration in the vicinity of the line memory 52 and the horizontal charge transfer section 54 are shown in an enlarged fashion in FIG. 3. As shown in FIG. 3, the horizontal charge transfer section 54 has a horizontal charge transfer channel 56 which extends in a strip-like fashion towards the direction indicated by the arrow X and horizontal transfer electrodes Ha and Hb which are formed over the horizontal charge transfer channel 56. A large number of the horizontal transfer electrodes Ha and Hb are provided. The horizontal transfer electrodes Ha and the horizontal transfer electrodes Hb are disposed alternately. The respective horizontal transfer electrode Ha is formed into a rectangular shape as viewed from the top, and the respective transfer electrode Hb is formed into an inverted L-shape as viewed from the top.

As shown in FIG. 3, the respective horizontal transfer electrode Ha and the respective horizontal transfer electrode Hb are disposed substantially in the same position so as to be adjacent to each other and form pairs. The pairs so made are electrically commonly connected to each other. In addition, any of four-phase horizontal transfer control signals (referred to as driving pulses) φH1, φH2, φH3 and φH4 is applied to the horizontal transfer electrodes Ha and Hb, which are aligned sequentially, according to positions where the respective horizontal electrodes Ha and Hb are disposed.

The sectional configuration taken along the line A-A in FIG. 2 is shown in FIG. 4. Although FIG. 4 illustrates a relative positional relationship among the vertical charge transfer section 130, the line memory 52 and the horizontal charge transfer section 54 and those configuration in a conceptual fashion, it should be noted that the dimensions of each element is not to accurate scale.

As shown in FIG. 4, a p-type impurity added region 35b is formed on the semiconductor substrate 35. The vertical charge transfer channel 37 for the vertical charge transfer section 130, a charge transfer channel 52a for the line memory 52 and the horizontal charge transfer channel 56 for the horizontal charge transfer section 54 are formed above the p-type impurity region 35b. Signal charges read out from the respective photoelectric conversion elements 120 are transferred to the output terminal OUT after passing sequentially through the vertical charge transfer channel 37, the charge transfer channel 52a and the horizontal charge transfer 56.

As shown in FIG. 4, vertical transfer electrodes V2, V3, V4 are provided above the vertical charge transfer channel 37 from an upstream side towards a downstream side of the charge transfer direction (the direction indicated by the arrow Y). It is noted that the vertical transfer electrodes V1, V2, V3, V4 shown in FIG. 4 correspond, respectively, to the second vertical transfer electrode 43 on the most downstream side, the first auxiliary transfer electrode 45, the second auxiliary transfer electrode 46 and the third auxiliary transfer electrode 47.

The vertical charge transfer channel 37 of the vertical charge transfer section 130 is formed as an n-type impurity region. In addition, as to the charge transfer channel 52a of the line memory 52, a charge transfer channel 52a(1) is formed of an n⁻-type impurity region, and a charge transfer channel 52a(2) is formed of an n-type impurity region.

As to the horizontal charge transfer channel 56 of the horizontal charge transfer section 54, the horizontal charge transfer channel 56 is formed of n-type impurity regions 75 and n⁻-type impurity regions 77 which are aligned alternately. The respective horizontal transfer electrodes Ha are disposed in positions above the n-type impurity regions 75, and the respective horizontal transfer electrodes Hb are disposed in positions above the n⁻-type impurity regions 77. It is noted that the horizontal transfer electrode Hb extends to turn round into a region defined between the transfer control electrode LM2 of the line memory 52 and the horizontal transfer electrode Ha. A portion below the region into which the horizontal transfer electrode Hb turns round is also formed of an n⁻-type impurity region.

Next, a basic operation will be described which is to be performed when transferring signal charges among the vertical charge transfer channel 37 of the vertical charge transfer section 130, the charge transfer region 52a of the line memory 52 and the horizontal charge transfer channel 56 of the horizontal charge transfer section 54.

In FIG. 5, potential distributions and charges to be transferred in six states of (a), (b), (c), (d), (e) and (f) used in transferring the signal charges in the respective charge transfer channels (37, 52, 56) shown in FIG. 4 are illustrated. Namely, a state of the respective charge transfer channel changes as shown in FIG. 5 by applying the predetermined driving pulses (φV1 to φV4, φLM, φH1 to φH4) to the respective electrodes.

In addition, in FIG. 5, V1 to V4 represent states of the electrodes (43, 45, 46, 47) to which the driving pulses (φV1 to φV4) are applied, respectively, and statuses of the charge transfer channel (37) which lies below the electrodes (43, 45, 46, 47). LM represents states of the electrodes (LM1, LM2) to which the driving pulse φLM is applied and statuses of the charge transfer channel (52) which lies below the electrodes (LM1, LM2). H1 to H4 represent states of the electrodes (Ha, Hb) to which the driving pulses (φH1 to φH4) are applied, respectively, and statuses of the charge transfer channel (56) which lies below the electrodes (Ha, Hb).

Additionally, in FIG. 5, the respective potentials are represented by only two values; that is, "H" which is a relatively high level (hereinafter, referred to simply as a "high level") and "L" which is a relatively low level (hereinafter, referred to simply as "low level").

In a state in FIG. 5(a), the respective electrodes V1, V4, H1, H3 are at the low level, and the respective electrodes V2, V3, LM, H4 are at the high level. Signal charges of the vertical charge transfer section 130 are stored in the charge transfer channel which lies below the electrodes V2, V3.

From this state, as shown in FIG. 5(b), when the electrode V4 is changed to the high level, since a barrier region (a potential barrier) in the charge transfer channel lying below the electrode V4 is eliminated, the signal charges move to the charge transfer channel 52a of the line memory 52 which lies below the transfer control electrode LM.

Next, as shown in FIG. 5(c), by switching the electrode V4 to the high level so as to form the barrier region on the vertical charge transfer channel 37, it is prohibited that the charge move back to the vertical charge transfer section 130. Thereafter, the electrode H1 is switched to the high level. Since the n⁻ impurity region is present between the transfer control electrode LM and the horizontal charge transfer section 54, the signal charges on the line memory 52 do not move.

Then, furthermore, as shown in FIG. 5(d), when the transfer control electrode LM is switched to the low level, the signal charges move to the charge transfer channel below the electrode H1. Namely, FIG. 5(d) shows a state in which the signal charges has moved from the vertical charge transfer section 130 to the horizontal charge transfer section 54 through the line memory 52.

When attempting to move the signal charges on the horizontal charge transfer section 54 towards the direction indicated by the arrow X, the potential level of the adjacent electrode is changed and an upstream side which lies in a direction in which the signal charges move is switched to the low level.

For example, as shown in FIG. 5(e), when the electrodes H1, H4 are both at the low level, as with the case shown in FIG. 5(d), there occurs no movement of the signal charges. Then, for example, as shown in FIG. 5(f), when the downstream-side electrode H4 is switched to the high level with the electrode H1 being kept at the low level, the signal charges stored in the upstream-side charge transfer channel move to the downstream side.

Consequently, as shown in FIG. 5, the signal charges can be moved on the charge transfer channels towards a necessary movement direction by switching sequentially the potentials of the driving pulses which are to be applied to the respective electrodes.

Incidentally, in order to read out all signal charges of one frame sensed by the image sensing section 110 of the solid-state imaging device 100 as shown in FIG. 1 from the respective photoelectric conversion elements 120 so as to output them from the output terminal OUT, basically, the following operations is performed.

(S1) Signal charges generated in the respective photoelectric conversion elements 120 are transferred to the charge transfer channel 37 of the vertical charge transfer section 130 which are in the position adjacent to the respective photoelectric conversion elements 120.

(S2) The signal charges are transferred by one pixel in the direction indicated by the arrow Y on the vertical charge transfer section 130. In addition, the signal charges for one line that are output from the most downstream positions of the respective vertical charge transfer sections 130 are transferred to the line memory 52.

(S3) The signal charges for one line that are stored in the line memory 52 are transferred from the line memory 52 to the horizontal charge transfer section 54.

(S4) The signal charges are transferred in the direction indicated by the arrow X on the charge transfer channel 56 of the horizontal charge transfer section 54, and the signal charges for one line are output from the output terminal OUT via the output amplifier 55.

(S5) The operations described in (1) to (4) are repeated for all the rows of the image sensing section 110.

Namely, every time signal charges for one row are read out, the signal charges are transferred by one pixel in the direction indicated by the arrow Y in step S2 (a first transfer process), the signal charges are transferred from the line memory 52 to the horizontal charge transfer section 54 in step S3 (a second transfer process), and the signal charges are transferred in the direction indicated by the arrow X on the charge transfer channel 56 in step S4 (a third transfer process).

Figure 14:
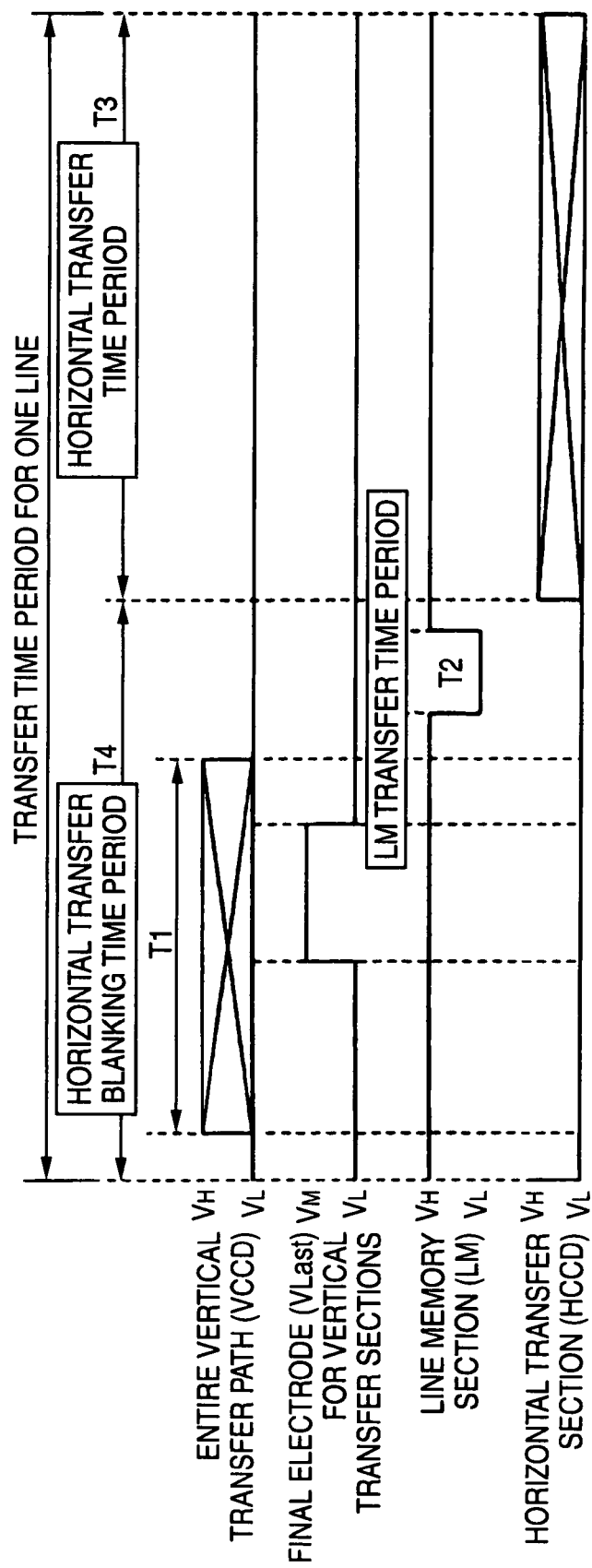
FIG. 14 is a timing chart showing control timings when a sold state image sensing device is driven.

In FIG. 14, when implementing the driving process of the solid-state imaging device 100, the first, second and third transfer processes is performed sequentially. Because of this, for example, as shown in FIG. 14, a time period longer than the sum of a vertical transfer time period (T1) taken to perform the first process and an LM transfer time period (T2) taken to perform the second transfer process constitutes a horizontal transfer blanking time period (T4), and it has been inevitable that a time required for readout for one line which is the sum of the a horizontal transfer time period (T3) for performing the third transfer process and the horizontal transfer blanking time period (T4) has to be long.

Figure 6:
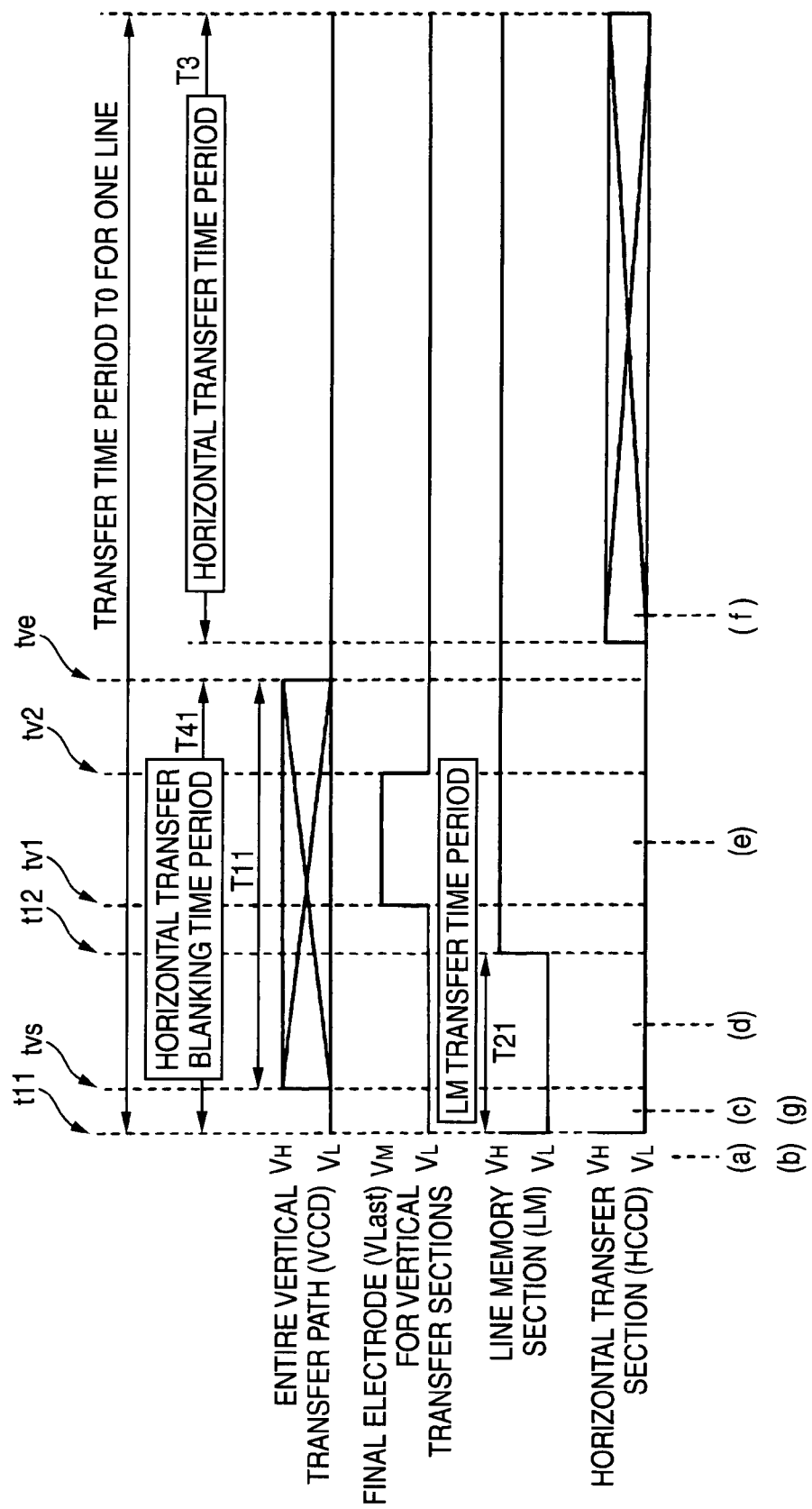
FIG. 6 is a timing chart showing control timings of a method for driving the solid-state imaging device, according to a first embodiment.

In order to shorten the time required for readout like this, in the first embodiment, the control timing for driving the solid-state imaging device 100 is modified as shown in FIG. 6. FIG. 6 is a timing chart which shows control timings of a method for driving the solid-state imaging device according to the first embodiment. It is noted that in FIG. 6, respective times t11, tvs, t12, tv1, tv2, tve represent relative times based on a starting time in a transfer time period T0 for one row.

Namely, the starting time t11 of the LM transfer time period T21 during which the second transfer process is executed is set before the starting time tvs of the vertical transfer time period T11 during which the first transfer process is executed. In addition, the time t12 at which the LM transfer time period T21 ends is a time in the midst of the process in the vertical transfer time period T11.

Namely, timings are determined so that the second transfer process is started before the first transfer process, and that a part of the time period (T21) for the second transfer process overlaps a part of the time period (T11) for the first transfer process.

In addition, in this embodiment, in conjunction with the vertical charge transfer operation of the vertical charge transfer section 130, a low level potential VL is applied to an electrode VLast (corresponding to 47 in FIG. 2) for the final charge transfer stages of the vertical charge transfer section 130 from the time t11 to the time tv1 in FIG. 6, and a middle level potential VM is applied thereto from the time tv1 to the time tv2. In this configuration, the time t12 is determined so that the LM transfer time period T21 ends before the time tv1 at which the middle level potential VM is started to be applied.

In this embodiment, it is assumed that potentials having two values, that is, the low level potential VL and the middle level potential VM are applied to the electrode VLast, and the middle level potential VM means that it is relatively lower than a high level potential VH (or H) that is applied to the other electrodes. In addition, a state in which the middle level potential VM is applied to the electrode VLast means a state in which signal charges from upstream are ready to be received by (introduced into) the charge transfer channels for the final charge transfer stages of the vertical charge transfer sections 30.

When implementing the driving control as shown in FIG. 6, since the LM transfer time period T21 and the vertical transfer time period T11 are made to overlap partially, a horizontal transfer blanking time period T41 can be made shorter than the sum of the length of the LM transfer time period T21 and the length of the vertical transfer time period T11. Consequently, the length of the horizontal transfer blanking time period T41 shown in FIG. 6 becomes shorter than the horizontal transfer blanking time period T4 shown in FIG. 14. The transfer time period T0 for one row is also made shorter, to thereby make it possible to increase the frame rate.

Here, states of the signal charges in the respective portions which are transferred through the main portions such as the region in the vicinity of the final charge transfer stage of the horizontal charge transfer section 130, the region of the line memory 52 and the region of the horizontal charge transfer section 54 of the solid-state imaging device 100 will be described with respect to the respective states when the driving control shown in FIG. 6 is implemented.

Figure 7:
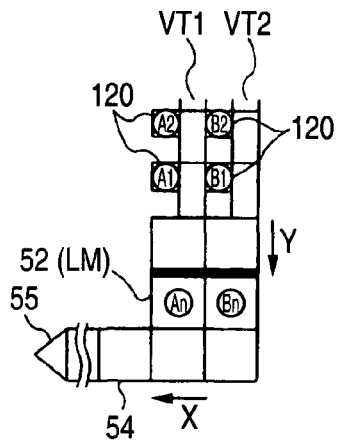
FIG. 7 is state transition diagrams showing states of main portions of the solid-state imaging device at respective points in time when implementing the control shown in FIG. 6.
Figure 7:
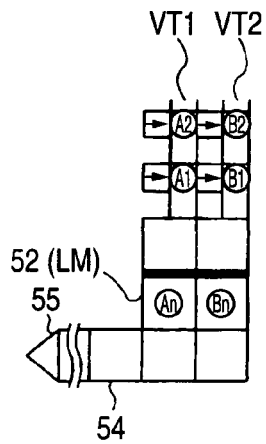
Figure 7:
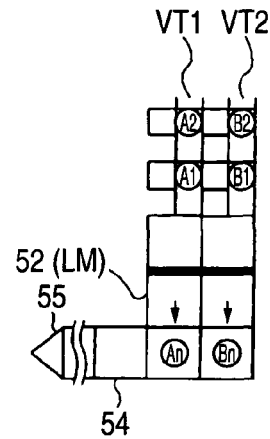
Figure 7:
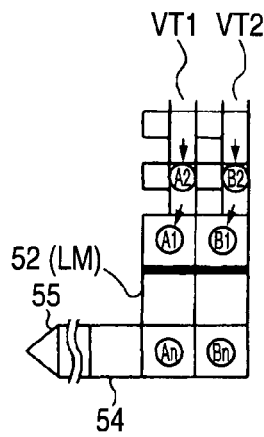
Figure 7:
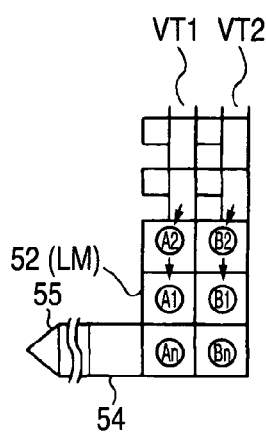
Figure 7:
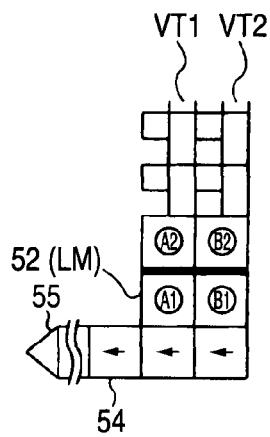
Figure 7:
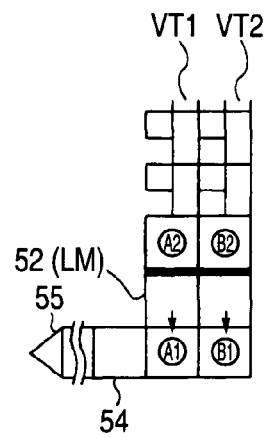

FIG. 7 shows state transition diagrams which illustrate states of the main portions of the solid-state imaging device at respective points in time when the control shown in FIG. 6 is implemented.

FIGS. 7(a), 7(b) show states at times before the time t11 shown in FIG. 6. FIG. 7(c), 7(g) show states at times between the time t11 and the time tvs shown in FIG. 6. FIG. 7(d) show a state at a time between the time tvs and the time t12 shown in FIG. 6, that is, a state in a time period during which the LM transfer time period T21 and the vertical transfer time period T11 overlap each other. FIG. 7(e) shows a state at a time between the time tv1 and the time tv2 shown in FIG. 6. FIG. 7(f) shows a state during the horizontal transfer time period T3 shown in FIG. 6.

It is noted that in FIG. 7, the vertical charge transfer channels 37 in two vertical charge transfer sections 130 which are adjacent to each other are shown as VT1, VT2, respectively. In the state shown in FIG. 7(a), signal charges A1, A2, B1, B2 which are generated by sensing an image are held in their corresponding photoelectric conversion elements 120. By applying a predetermined potential to the electrodes 43 of the vertical charge transfer sections 130 in this state, the signal charges A1, A2, B1, B2 which are held by the respective vertical charge transfer sections 130 are, as shown in FIG. 7(*b*), caused to move to the adjacent positions in the vertical charge transfer channels VT1, VT2, respectively.

In addition, in the states shown in FIGS. 7(*a*) and 7(*b*), the signal charges An, Bn which were obtained by sensing the previous frame remain on the line memory 52. Then, a predetermined potential is applied to the electrodes LM1, LM2 of the line memory 52 so that, as shown in FIG. 7(*c*), the signal charges An, Bn remaining on the line memory 52 are transferred to the horizontal charge transfer channel of the horizontal charge transfer section 54. Consequently, the LM transfer time period T21 can be started at the time t11 shown in FIG. 6 before the vertical charge transfer is started, to thereby make it possible to process the signal charges on the line memory 52.

When the vertical transfer time period T11 is started at the time tvs shown in FIG. 6, the four-phase driving pulses φV1 to φV4 are applied to the respective electrodes 43, 41, 45, 46, 47 of the vertical charge transfer sections 130. Thereby, as shown in FIG. 7(*d*), the signal charges A1, A2, B1, B2 which are held on the respective vertical charge transfer channels VT1, VT2 of the vertical charge transfer sections 130 move in the direction indicated by the arrow Y by one pixel every time the four-phase driving pulses are so applied. Namely, in the state shown in FIG. 7(*d*), the signal charges A1, B1 on the first row of the frame move to positions on the charge transfer channels below the electrode 47 for the final vertical charge stages of the vertical charge transfer sections, and the signal charges A2, B2 on the second row move to positions on the charge transfer channels which lie further upstream by one pixel than the signal charges A1, B1. In addition, in the state shown in FIG. 7(*d*), since the potential barrier is present between the charge transfer channels below the electrode 47 for the final vertical charge stages of the vertical charge transfer sections and the charge transfer channel of the line memory 52, the signal charges do not flow out from the vertical charge transfer sections 130 side.

When the time tv1 shown in FIG. 6 is reached, since the middle level potential VM is applied to the electrode 47 for the final charge transfer stages of the vertical charge transfer sections 130, the potential barrier disappears which is present between the charge transfer channels below the electrode 47 for the final charge transfer stages of the vertical charge transfer sections and the charge transfer channel of the line memory 52. Thereby, the respective signal charges move as shown in FIG. 7(*e*).

Namely, the signal charges A1, B1 on the first row of the frame move from the charge transfer channels below the electrode 47 for the final charge transfer stages of the vertical charge transfer sections 130 to the charge transfer channel of the line memory 52, and the signal charges A2, B2 on the second row move to the positions on the charge transfer channels below the electrode 47 for the final charge transfer stages of the vertical charge transfer sections 130.

In a state shown in FIG. 7(*f*), by applying the predetermined driving pulses φH1 to φH4 to the respective electrodes Ha, Hb of the horizontal charge transfer section 54, the signal charges for one line which are present on the horizontal charge transfer channel 56 of the horizontal charge transfer section 54 are transferred sequentially towards the direction indicated by the arrow X. Thereby, signals corresponding to the signal charges An, Bn on the final row of the previous frame are output sequentially from the output terminal OUT through the output amplifier 55.

By applying the predetermined driving pulse (φLM) to the electrodes (LM1, LM2) of the line memory 52 after the processing of the signal charges for one row has been completed and after no signal charge is on the horizontal charge transfer section 54, as shown in FIG. 7(*g*), the signal charges A1, B1 on the line memory 52 are transferred to the horizontal charge transfer channel of the horizontal charge transfer section 54.

Consequently, by repeating the operations corresponding to the states shown in FIGS. 7(*c*), (*d*), (*e*), (*f*), signal charges of images for one frame can be read out sequentially. Moreover, since the timing of the LM transfer time period T21 overlaps the vertical transfer time period T11 as shown in FIG. 6, the horizontal transfer blanking time T41 can be made substantially as short as the vertical transfer time period T11, to thereby make it possible to realize a fast readout operation.

Figure 8:
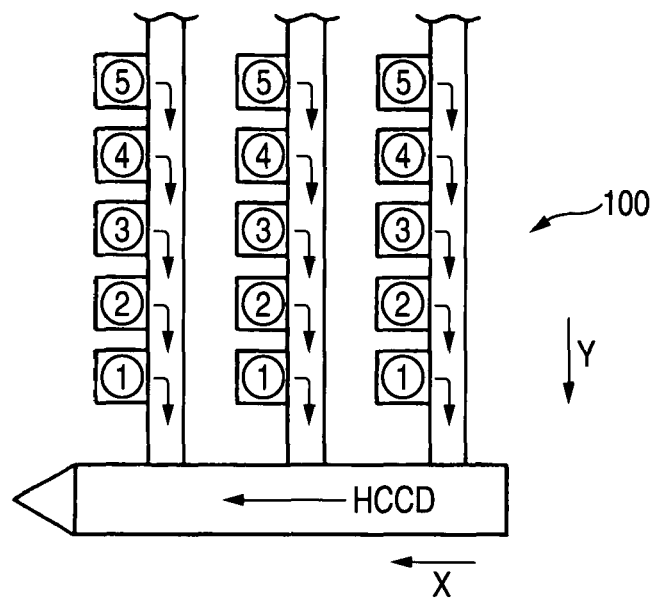
FIG. 8 is exemplary diagrams representing an operation example of the solid-state imaging device when the control shown in FIG. 6 is implemented.
Figure 8:
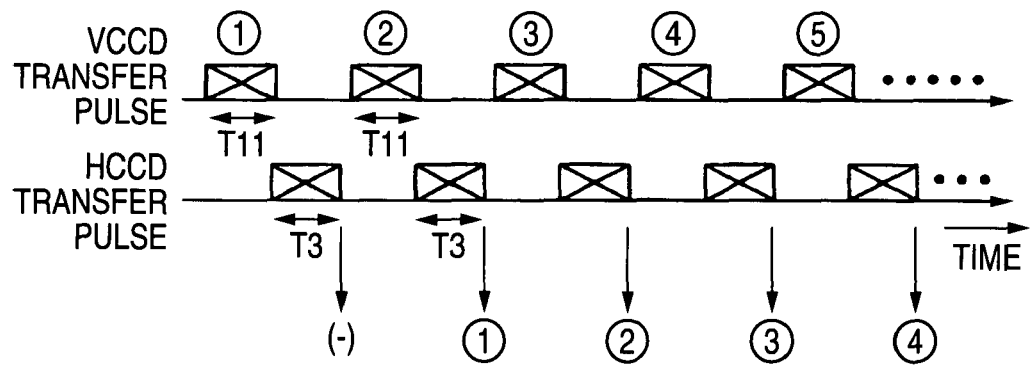

For example, when signal charges of respective rows which are numbered as 1, 2, 3, 4 and 5 as shown in FIG. 8(*a*) are read out from a solid-state imaging device 100, almost no gap needs to be provided, as shown in FIG. 8(*b*), between the time period (T11) for outputting VCCD transfer pulses (corresponding to φV1 to φV4) which control the vertical charge transfer sections and the time period (T3) for outputting HCCD transfer pulses (corresponding to φH1 to φH4) which control the horizontal charge transfer section. The signal charges of the respective rows 1, 2, 3, 4, 5 can be read out substantially in succession.

Incidentally, when the solid-state imaging device 100 is driven at such a timing that the LM transfer time period T21 and the vertical transfer time period T11 overlap each other as shown in FIG. 6, there is a possibility that signal charges which appear at the outputs of the vertical charge transfer sections 130 flow out into the horizontal charge transfer section 54 through the line memory 52 without any interruption. Should this happen, there is a fear that signal charges of an upstream-side row and signal charges of a downstream-side row adjacent to the upstream-side row are mixed with each other.

In the case where the signal charges of the upstream-side row and the signal charges of the downstream-side row adjacent to the upstream-side row are mixed with each other, a resolution in the Y direction is reduced. Therefore, it is necessary to ensure that the signal charges which appear at the outputs of the vertical charge transfer sections 130 are prevented from flowing out into the horizontal charge transfer section 54 through the line memory 52 without any interruption.

In FIG. 6, the driving timings are determined so that the time t12 at which the LM transfer time period T21 ends is before the time tv1 at which the middle level potential VM is applied to the electrode VLast (47) for the final charge transfer stages of the vertical charge transfer sections 130. In this case, the signal charges which appear at the outputs of the vertical charge transfer sections 130 can be prevented from flowing out into the horizontal charge transfer section 54 through the line memory 52 without any interruption.

Figure 9:
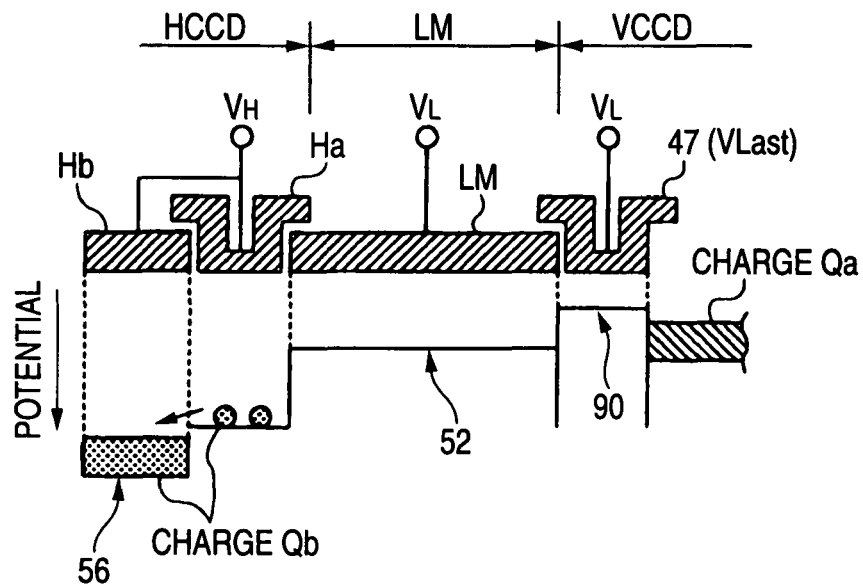
FIG. 9 is exemplary diagrams representing a specific example of potential distribution in relation to the main portions of the solid-state imaging device.
Figure 9:
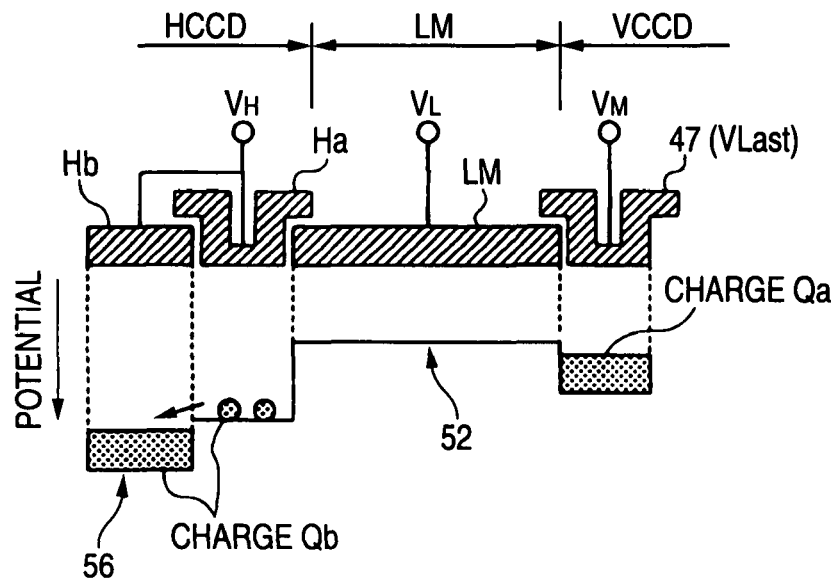

Potential distributions and signal charge states of the respective electrodes and charge transfer channels at connecting portions among the final charge transfer stages of the vertical charge transfer sections 130, the line memory 52 and the horizontal charge transfer section 54 are shown in FIG. 9.

In the control shown in FIG. 6, the low level potential VL is applied to the electrode VLast (47) for the final charge transfer stages of the vertical charge transfer sections over the entire portion of the LM transfer time period T21. In this state, a potential distribution as shown in FIG. 9(*a*) is formed.

Namely, in the state shown in FIG. 9(a), the signal charges accumulated on the line memory 52 are transferred to the horizontal charge transfer channel 56 of the horizontal charge transfer section according to the potential distribution. In addition, although the following signal charge Qa appears on an upstream side of the electrode VLast for the final charge transfer stage of the vertical charge transfer section, since the low level potential VL is applied to the electrode VLast, as shown in FIG. 9(a), a potential barrier 90 is formed on the charge transfer channel below the electrode VLast. Thereby, the upstream signal charge Qa is blocked by this potential barrier 90 and cannot flow out to the line memory 52 side. Consequently, there occurs no case where the upstream signal charge Qa and a downstream signal charge Qb are mixed with each other.

Second Embodiment

A method for driving the solid-state imaging device according to another embodiment of the invention will be described with reference to FIGS. 10 and 11.

Figure 10:
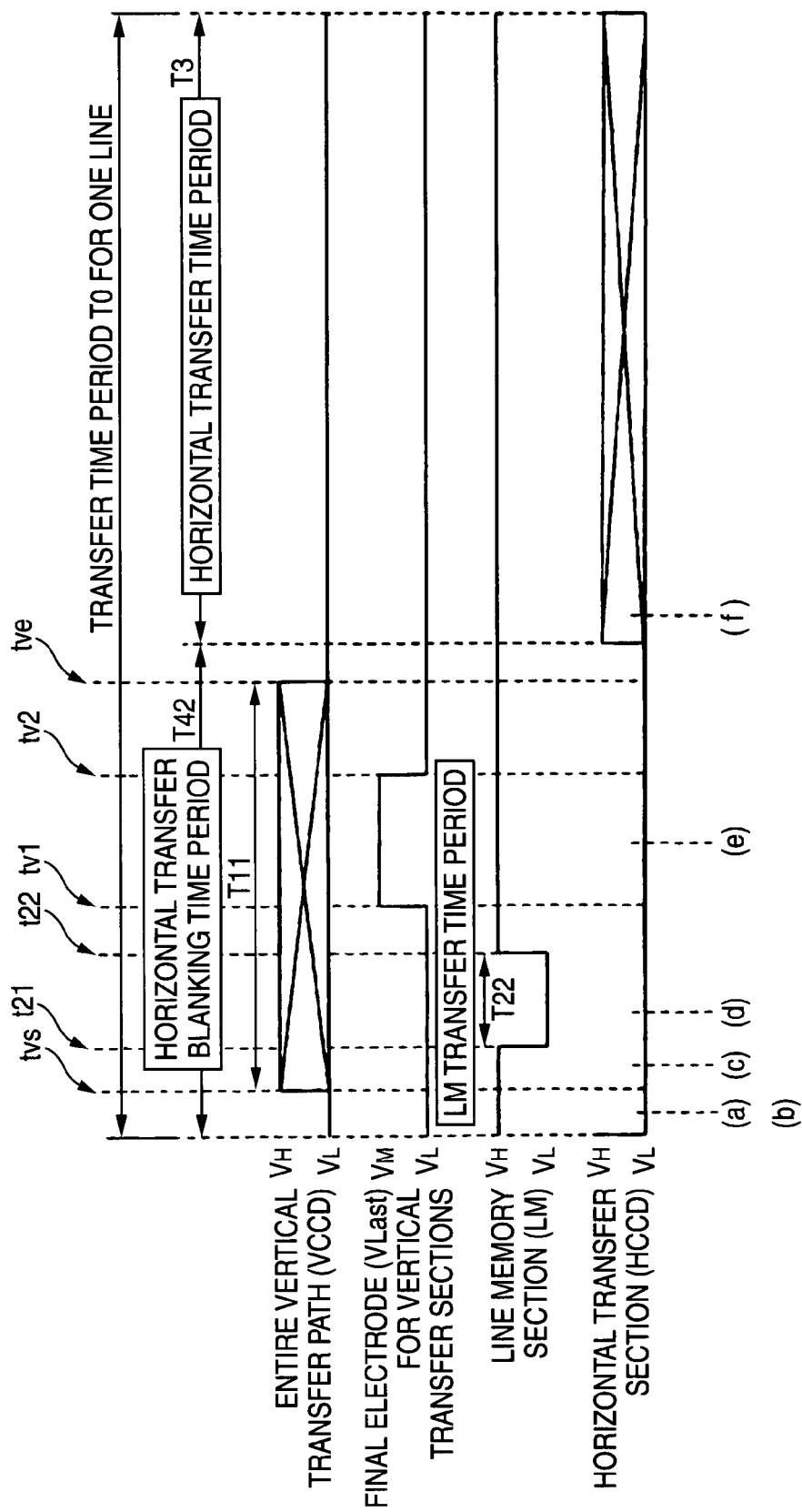
FIG. 10 is a timing chart showing control timings of a method for driving a solid-state imaging device, according to a second embodiment.

FIG. 10 is a timing chart which shows control timings of a method for driving the solid-state imaging device according to a second embodiment of the invention. FIG. 11 is state transition diagrams which show states of main portions of the solid-state imaging device at respective points in time when a control shown in FIG. 10 is performed.

As with the first embodiment, in this embodiment, it is assumed that the solid-state imaging device configured as shown in FIGS. 1 to 4 is driven. Consequently, the description of the basic configuration and operation of the solid-state imaging device 100 which is a control target will be omitted here.

In order to read out all signal charges of one frame sensed by the sensing section 110 of the solid-state imaging device 100 as shown in FIG. 1 from the respective photoelectric conversion elements 120 so as to be output from an output terminal OUT, basically, the steps S1 to S5 are performed.

Then, in order to shorten the aforesaid time required for readout, in this embodiment, the control timings for driving the solid-state imaging device 100 are modified as shown in FIG. 10. It is noted that in FIG. 10, respective times t21, tvs, t22, tv1, tv2 and tve represent relative times based on a starting time of a transfer time period T0 for one row.

Namely, as shown in FIG. 10, the starting time t21 and the ending time t22 of an LM transfer time period T22 during which the second transfer process is executed are disposed between the starting time tvs and the ending time tve of the vertical transfer time period T11 during which the first transfer process is executed.

Namely, timings are determined so that the second transfer process is executed in the midst of performing the first transfer process and that the whole portion of the time period (T22) for the second transfer process overlaps a part of the time period (T11) for the first transfer process.

In addition, in this embodiment, in conjunction with a vertical charge transfer operation of the vertical charge transfer sections 130, the low level potential VL is applied to the electrode VLast (corresponding to 47 in FIG. 2) for the final charge transfer stages of the vertical charge transfer sections 130 from the time tvs to the time tv1 in FIG. 10, and the middle level potential VM is applied thereto between the time tv1 and the time tv2. In this configuration, the time t22 is determined so that the LM transfer time period T22 ends before the time tv1 at which the middle level potential VM is started to be applied.

It is noted that in this embodiment, it is assumed that potentials having two values, that is, the low level potential VL and the middle level potential VM are applied to the electrode VLast, and that the middle level potential VM means that it is relatively lower than a high level potential VH (or H) that is applied to the other electrodes. In addition, a state in which the middle level potential VM is applied to the electrode VLast means a state in which signal charges from upstream are ready to be received by (introduced into) charge transfer channels for the final charge transfer stages of the vertical charge transfer sections 30.

When implementing the driving control as shown in FIG. 10, since the LM transfer time period T22 and the vertical transfer time period T11 are made to overlap each other, a horizontal transfer blanking time period T42 can be made shorter than the sum of the length of the LM transfer time period T22 and the length of the vertical transfer time period T11. Consequently, the length of the horizontal transfer blanking time period T42 shown in FIG. 10 becomes shorter than the horizontal transfer blanking time period T4 shown in FIG. 14. The transfer time period T0 for one row is also made shorter, to thereby make it possible to increase the frame rate.

States of the signal charges of respective sections which are transferred through main portions such as the region in the vicinity of the final charge transfer stage of the horizontal charge transfer section 130, the region of a line memory 52 and the region of a horizontal charge transfer section 54 of the solid-state imaging device 100 will be described with reference to FIG. 11, with respect to the respective states when the driving control shown in FIG. 10 is implemented.

FIGS. 11(a), 11(b) show states at times before the time tvs shown in FIG. 10. FIG. 11(c) show a state at a time between the time tvs and the time t21 shown in FIG. 10. FIG. 11(d) show a state at a time between the time t21 and the time t22 shown in FIG. 10, that is, a state in a time period during which the LM transfer time period T22 and the vertical transfer time period T11 overlap each other. FIG. 11(e) shows a state at a time between the time tv1 and the time tv2 shown in FIG. 10. FIG. 11(f) shows a state during a horizontal transfer time period T3 shown in FIG. 10.

Figure 11:
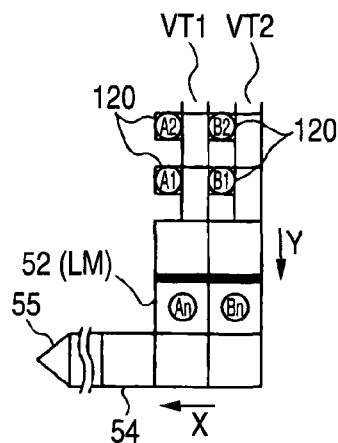
FIG. 11 is state transition diagrams showing states of main portions of the solid-state imaging device at respective points in time when the control shown
Figure 11:
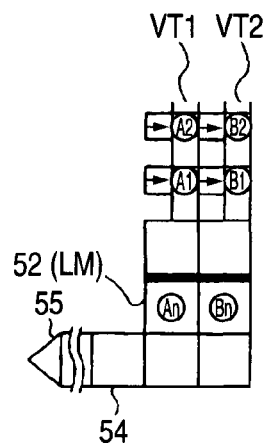
Figure 11:
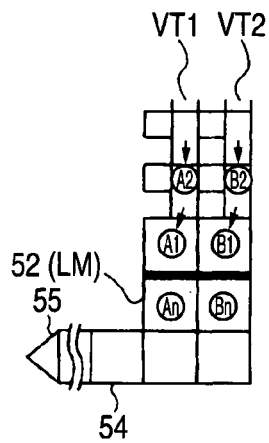
Figure 11:
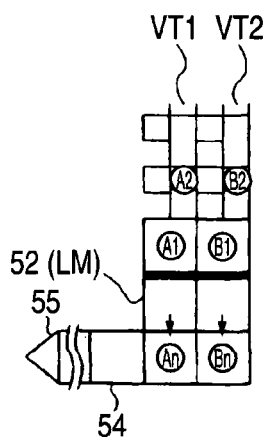
Figure 11:
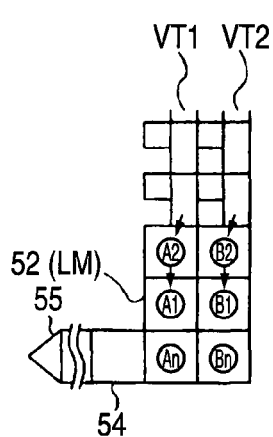
Figure 11:
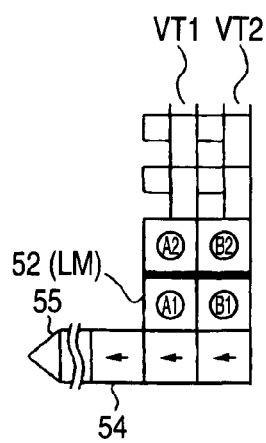
Figure 11:
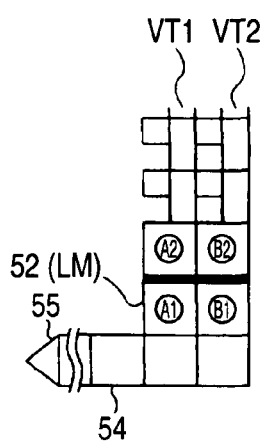
Figure 11:
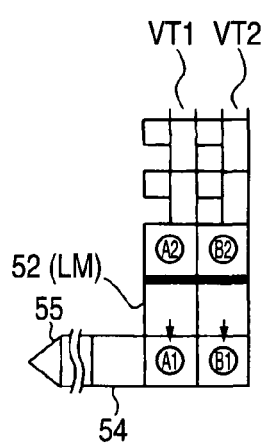

It is noted that in FIG. 11, vertical charge transfer channels at two vertical charge transfer sections adjacent to each other are shown as VT1, VT2, respectively. In the state shown in FIG. 11(a), signal charges A1, A2, B1, B2 which are generated by sensing an image are held on their corresponding photoelectric conversion elements 120. By applying a predetermined potential to the electrodes 43 of the vertical charge transfer sections in this state, the signal charges A1, A2, B1, B2 which are held by the respective the photoelectric conversion elements 120 are, as shown in FIG. 11(b), moved to the vertical charge transfer channels VT1, VT2 in the adjacent positions, respectively. In addition, in the states shown in FIGS. 11(a), 11(B), signal charges An, Bn which were obtained by sensing the previous frame remain on the line memory 52.

When the vertical transfer time period T11 is started at the time tvs shown in FIG. 10, the four-phase driving pulses ϕV1 to ϕV4 are applied to the respective electrodes 43, 41, 45, 46, 47 of the vertical charge transfer sections. Thereby, as shown in FIG. 11(c), the signal charges A1, A2, B1, B2 which are held on the respective vertical charge transfer channels VT1, VT2 of the vertical charge transfer sections move in the Y direction by one pixel every time the four-phase driving pulses are so applied. Namely, in the state shown in FIG. 11(c), the signal charges A1, B1 on the first row of the frame move to positions on the charge transfer channels below the electrode 47 for the final vertical charge stages of the vertical charge transfer sections. Also, the signal charges A2, B2 on the second row move to positions on the charge transfer channels which lie further upstream by one pixel than the signal charges A1, B1.

When the LM transfer time period T22 is started at the time t21 shown in FIG. 10, the predetermined potential φLM is applied to electrodes LM1, LM2 of the line memory 52, so that charge signals An, Bn of the previous frame which remain on the line memory 52 are, as shown in FIG. 11(d), moved to the horizontal charge transfer channel of the horizontal chare transfer section 54. In addition, in the state shown in FIG. 11(d), since the potential barrier is present between the charge transfer channels below the electrode 47 for the final charge transfer stages of the horizontal charge transfer sections and the charge transfer channel of the line memory 52, the signal charges do not flow out from the vertical charge transfer sections side.

When the time tv1 shown in FIG. 10 is reached, since the middle level potential VM is applied to the electrode 47 for the final charge transfer stages of the vertical charge transfer sections, the potential barrier disappears which is present between the charge transfer channels below the electrode 47 for the final charge transfer stages of the vertical charge transfer sections and the charge transfer channel of the line memory 52. Thereby, the respective signal charges move as shown in FIG. 11(e).

Namely, the signal charges A1, B1 on the first row of the frame move from the charge transfer channels below the electrode 47 for the final charge transfer stages of the vertical charge transfer sections to the charge transfer channel of the line memory 52. Also, the signal charges A2, B2 on the second row move to the positions on the charge transfer channels below the electrode 47 for the final charge transfer stages of the vertical charge transfer sections.

In a state shown in FIG. 11(f), by applying the predetermined driving pulses φH1 to φH4 to the respective electrodes Ha, Hb of the horizontal charge transfer section 54, signal charges for one line which are present on the horizontal charge transfer channel of the horizontal charge transfer section 54 are transferred sequentially towards the X direction. Thereby, signals corresponding to the signal charges An, Bn on the final row of the previous frame are output sequentially from the output terminal OUT through an output amplifier 55.

By applying the predetermined driving pulse φLM to the electrodes LM1, LM2 of the line memory 52 after the processing of the signal charges for one row has been completed and after no signal charge is on the horizontal charge transfer section, as shown in FIG. 11(h), the signal charges A1, B1 on the line memory 52 are transferred to the horizontal charge transfer channel of the horizontal charge transfer section 54.

Consequently, by repeating the operations corresponding to the states shown in FIGS. 11(c), (d), (e), (f), signal charges of images for one frame can be read out sequentially. Moreover, since the timing of the LM transfer time period T22 overlaps the vertical transfer time period T11 as shown in FIG. 10, the horizontal transfer blanking time T42 can be made substantially as short as the vertical transfer time period T11, to thereby make it possible to realize a fast readout operation.

Incidentally, when the solid-state imaging device 100 is driven at such a timing that the LM transfer time period T22 and the vertical transfer time period T11 overlap each other as shown in FIG. 10, there is a possibility that signal charges which appear at the outputs of the vertical charge transfer sections 130 flow out into the horizontal charge transfer section 54 through the line memory 52 without any interruption. Should this happen, there is a fear that signal charges of an upstream-side row and signal charges of a downstream-side row which neighbors the upstream-side row are mixed with each other.

In the case where the signal charges of the upstream-side row and the signal charges of the downstream-side row which neighbors the upstream-side row are mixed with each other, a resolution in the Y direction is reduced. Therefore, it is necessary to ensure that the signal charges which appear at the outputs of the vertical charge transfer sections are prevented from flowing out into the horizontal charge transfer section 54 through the line memory 52 without any interruption.

As shown in FIG. 10, in the event that the driving timings are determined so that the time t22 at which the LM transfer time period T22 ends is before the time tv1 at which the middle level potential VM appears on the electrode VLast (47) for the final charge transfer stages of the vertical charge transfer sections, the signal charges output from the vertical charge transfer sections can be prevented from flowing out into the horizontal charge transfer section 54 through the line memory 52 without any interruption.

Potential distributions and signal charge states of the respective electrodes and charge transfer channels at connecting portions among the final charge transfer stages of the vertical charge transfer sections 130, the line memory 52 and the horizontal charge transfer section 54 are as shown in FIG. 9.

In the control shown in FIG. 10, the low level potential VL is applied to the electrode VLast for the final charge transfer stages of the vertical charge transfer sections 130 over the whole portion of the LM transfer time period T22. In this state, the potential barrier 90 is formed on the charge transfer channels lying below the electrode VLast as shown in FIG. 9(a). Thereby, an upstream signal charge Qa is blocked by this potential barrier 90 and cannot flow out to the line memory 52 side. Consequently, there occurs no case where the upstream signal charge Qa and a downstream signal charge Qb are mixed with each other.

Third Embodiment

A method for driving the solid-state imaging device according to a further another embodiment of the invention will be described below with reference to FIG. 12.

Figure 12:
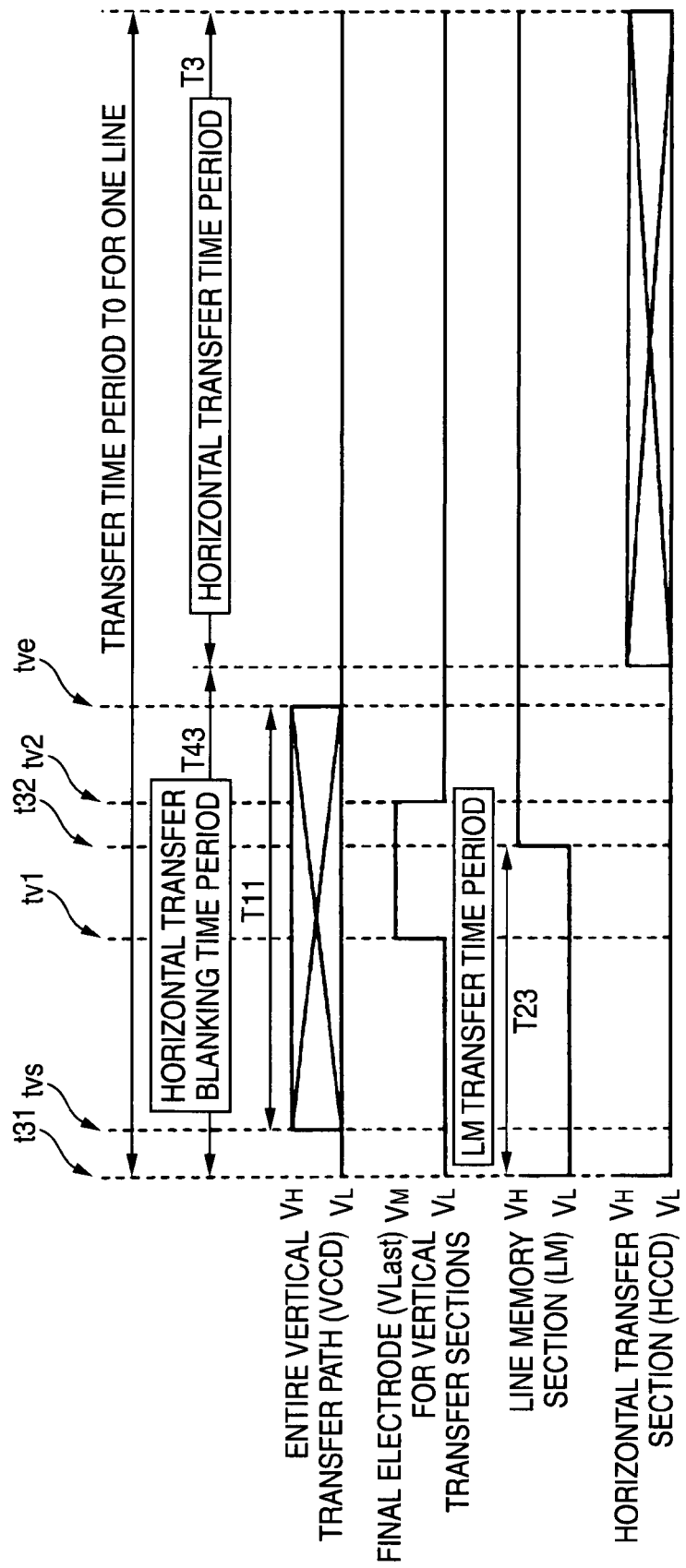
FIG. 12 is a timing chart showing control timings of a method for driving a solid-state imaging device driving, according to a third embodiment.

FIG. 12 is a timing chart which shows control timings of the method for driving the solid-state imaging device according to a third embodiment.

In this embodiment, as with the first embodiment, it is assumed that the solid-state imaging device 100 configured as shown in FIGS. 1 to 4 is driven. Consequently, the description of the basic configuration and operation of the solid-state imaging device 100 which is a control target will be omitted here.

In order to read out all signal charges of one frame sensed by the sensing section 110 of the solid-state imaging device 100 as shown in FIG. 1 from the respective photoelectric conversion elements 120 so as to be output from an output terminal OUT, basically, the steps S1 to S5 are performed. In order to shorten a time required for readout, in this embodiment, the control timings for driving the solid-state imaging device 100 are modified as shown in FIG. 12. It is noted that in FIG. 12, respective times t31, tvs, t32, tv1, tv2 and tve represent relative times based on a starting time of a transfer time period T0 for one row.

Namely, as shown in FIG. 12, the starting time t31 of the LM transfer time period T23 during which the second transfer process is executed is before the starting time tvs of the vertical transfer time period T11 during the first transfer process is executed. In addition, the time t32 at which the LM transfer time period T23 ends is in the midst of a processing performed in the vertical transfer time period T11.

Namely, timings are determined so that the second transfer process is started earlier than the first transfer process and that a part of the time period (T23) for the second transfer process and a part of the time period (T11) for the first transfer process overlap each other.

In addition, in this embodiment, in conjunction with a vertical charge transfer operation of the vertical charge transfer sections 130, the low level potential VL is applied to the electrode VLast (corresponding to 47 in FIG. 2) for the final charge transfer stages of the vertical charge transfer sections 130 from the time t31 to the time tv1 in FIG. 12. The middle level potential VM is applied thereto between the time tv1 and the time tv2. The low level potential VL is applied after the time tv2. In this configuration, the time t32 is determined so that the LM transfer time period T23 ends during the time period (between tv1 and tv2) for which the middle level potential VM is being applied.

In this embodiment, it is assumed that potentials having two values, that is, the low level potential VL and the middle level potential VM are applied to the electrode VLast, and that the middle level potential VM means that it is relatively lower than a high level potential VH (or H) that is applied to the other electrodes. In addition, a state in which the middle level potential VM is applied to the electrode VLast means a state in which signal charges from upstream are ready to be received by (introduced into) charge transfer channels for the final charge transfer stages of the vertical charge transfer sections 30.

When implementing the driving control as shown in FIG. 12, since the LM transfer time period T23 and the vertical transfer time period T11 are made to overlap partially, a horizontal transfer blanking time period T43 can be made shorter than the sum of the length of the LM transfer time period T23 and the length of the vertical transfer time period T11. Consequently, the length of the horizontal transfer blanking time period T43 shown in FIG. 12 becomes shorter than the horizontal transfer blanking time period T4 shown in FIG. 14. The transfer time period T0 for one row is also made shorter, to thereby make it possible to increase the frame rate.

In the third embodiment, as shown in FIG. 12, the time t3 at which the LM transfer time period T23 ends is in the time period (between tv1 and tv2) during which the middle level potential VM is being applied to the electrode VLast for the final charge transfer stages of the vertical charge transfer sections 130. Therefore, the length of the LM transfer time period T23 can be made long sufficiently as compared with the LM transfer time period T21 of the first embodiment.

Since the electrodes LM1, LM2 for controlling a transfer on the line memory 52 are broad, when charges are transferred from the line memory 52 to a horizontal charge transfer section 54, a relatively long time tends to be taken to complete the transfer. Consequently, in the event that the length of the LM transfer period is restricted to be short, as the frequency of the driving pulse φLM becomes higher, the possibility becomes higher that charges remain on a charge transfer channel of a transfer origin after the end of a transfer operation. As a result, the quality of signals that are output from the solid-state imaging device 100 may be deteriorated. By controlling the transfer at timings as shown in FIG. 12, the LM transfer time period T23 which has a sufficient length can be secured, and even though the frequency of the driving pulse φLM is high, charges can be prevented from being left on the charge transfer channel of the transfer origin after the end of the transfer.

Incidentally, when the solid-state imaging device 100 is driven at such a timing that the LM transfer time period T23 and the vertical transfer time period T11 overlap each other as shown in FIG. 12, there is a possibility that signal charges which are output from the vertical charge transfer sections flow out into the horizontal charge transfer section 54 through the line memory 52 without any interruption. Should this happen, there is a fear that signal charges of an upstream-side row and signal charges of a downstream-side row which neighbors the upstream-side row are mixed with each other.

Then, as shown in FIG. 12, in the event that the driving timings are determined so that the time t32 at which the LM transfer time period T23 ends is in the time period (between tv1 to tv2) during which the middle level potential VM is appearing at the electrode VLast (47) for the final charge transfer stages of the vertical charge transfer sections 130, as will be described below, signal charges which are output from the vertical charge transfer sections can be prevented from flowing out into the horizontal charge transfer section 54 through the line memory 52 without any interruption.

In addition, potential distributions and signal charge states of the respective electrodes and charge transfer channels at connecting portions among the final charge transfer stages of the vertical charge transfer sections 130, the line memory 52 and the horizontal charge transfer section 54 are as shown in FIG. 9.

While the low level potential VL is being applied to the electrode VLast (47) for the final charge transfer stages of the vertical charge transfer sections during the LM transfer time period T23 shown in FIG. 12, the potential barrier 90 is formed on charge transfer channels lying below the electrode VLast as shown in FIG. 9(a). Thereby, an upstream signal charge Qa is blocked by this potential barrier 90 and cannot flow out to the line memory 52 side. Consequently, there occurs no case where the upstream signal charge Qa and a downstream signal charge Qb are mixed with each other.

In addition, in the LM transfer time period T23 shown in FIG. 12, during the time period between the times tv1 and tv2, as shown in FIG. 9(b), the signal charges accumulated on the line memory 52 are transferred on to a horizontal charge transfer channel 56 of the horizontal charge transfer section 54. In addition, since the potential barrier 90 is eliminated by the middle level potential VM that has been applied to the electrode VLast for the final charge transfer stages of the vertical charge transfer sections 130, the following signal charge Qa that appears on the upstream side moves to the charge transfer channels below the electrode VLast.

However, since the low level potential VL is being applied to the electrode for the line memory 52 during the time period between the time tv1 and the time tv2, as shown in FIG. 9(b), the potential at the line memory 52 is low as compared with the electrode VLast, and the line memory 52 functions as a potential barrier against the signal charge Qa. Consequently, there occurs no case where the signal charge Qa which has flowed into the charge transfer channels below the electrode VLast for the final charge transfer stages of the vertical charge transfer sections 130 flow out to the horizontal charge transfer section 54 side through the line memory 52. Thus, there occurs no case where the upstream signal charge Qa and a downstream signal charge Qb are mixed with each other.

In addition, in the case where the time at which the LM transfer time period T23 ends is changed to a time at or after the time tv2, since the potential below the electrode VLast becomes lower than the potential of the line memory 52, the signal charge Qa which has flowed into the charge transfer channels lying below the electrode VLast comes to flow out to the horizontal charge transfer section 54 side through the line memory 52. Consequently, the control needs to be implemented at the timings shown in FIG. 12.

Embodiment 4

Figure 13:
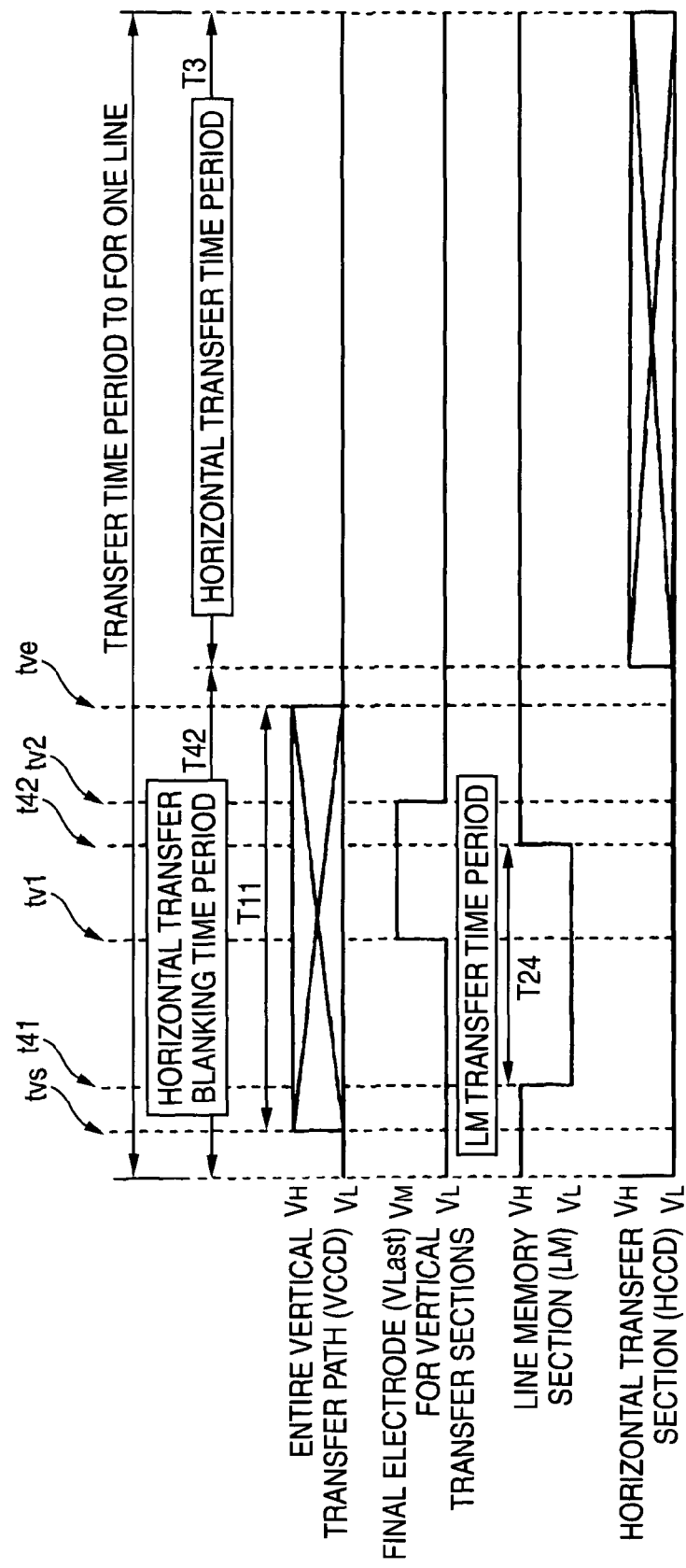
FIG. 13 a timing chart showing control timings of a method for driving a solid-state imaging device, according to a fourth embodiment.

The method for driving the solid-state imaging device driving method according to a still further another embodiment of the invention will be described below with reference to FIG. 13. FIG. 13 is a timing chart which shows control timings of the method for driving the solid-state imaging device driving method according to a fourth embodiment.

In this embodiment, as with the second embodiment, it is assumed that the solid-state imaging device 100 configured as shown in FIGS. 1 to 4 is driven. Consequently, the description of the basic configuration and operation of the solid-state imaging device 100 which is a control target will be omitted here.

In order to read out all signal charges of one frame sensed by the sensing section 110 of the solid-state imaging device 100 as shown in FIG. 1 from the respective photoelectric conversion elements 120 so as to be output from the output terminal OUT, basically, the steps S1 to S5 are performed.

In order to shorten a time required for readout, in the fourth embodiment, the control timings for driving the solid-state imaging device 100 are modified as shown in FIG. 13. It is noted that in FIG. 13, respective times t41, tvs, t42, tv1, tv2 and tve represent relative times based on a starting time of a transfer time period T0 for one row.

Namely, as shown in FIG. 13, the starting time t41 and the ending time t42 of an LM transfer time period T24 during which the second transfer process is executed is disposed between the starting time tvs and the ending time tve of the vertical charge transfer time period T11 during which the first transfer process is executed. Namely, timings are set so that the time period T24 for the second transfer process and the time period T11 for the first transfer process overlap each other so that the second transfer process is executed in the midst of the first transfer process.

In addition, in this embodiment, in conjunction with a vertical charge transfer operation of vertical charge transfer sections 130, the low level potential VL is applied to the electrode VLast (corresponding to 47 in FIG. 2) for final charge transfer stages of the vertical charge transfer sections 130 from the time tvs to the time tv1 as shown in FIG. 13. The middle level potential VM is applied thereto between the time tv1 and the time tv2. The low level potential VL is applied on or after the time tv2. In this configuration, the time t42 is determined so that the LM transfer time period T24 ends in the time period (between tv1 and tv2) during which the middle level potential VM is being applied.

It is noted that in this embodiment, it is assumed that potentials having two values, that is, the low level potential VL and the middle level potential VM are applied to the electrode VLast, and that the middle level potential VM means that it is relatively lower than a high level potential VH (or H) that is applied to the other electrodes. In addition, a state in which the middle level potential VM is applied to the electrode VLast means a state in which signal charges from upstream are ready to be received by (introduced into) charge transfer channels for the final charge transfer stages of the vertical charge transfer sections 30.

When implementing the driving control as shown in FIG. 13, since the LM transfer time period T24 and the vertical transfer time period T11 are made to overlap each other, a horizontal transfer blanking time period T44 can be made shorter than the sum of the length of the LM transfer time period T24 and the length of the vertical transfer time period T11. Consequently, the length of the horizontal transfer blanking time period T44 shown in FIG. 13 becomes shorter than the horizontal transfer blanking time period T4 shown in FIG. 14. Also, the transfer time period T0 for one row is also made shorter, to there by make it possible to increase the frame rate.

In the fourth embodiment, as shown in FIG. 13, since the time t4 at which the LM transfer time period T24 ends is the time period (between tv1 and tv2) during which the middle level potential VM is being applied to the electrode VLast for the final charge transfer stages of the vertical charge transfer sections 130, the length of the LM transfer time period T24 can be made long sufficiently as compared with the LM transfer time period T22 of the second embodiment.

Since the electrodes LM1, LM2 for controlling a transfer on the line memory 52 are broad, when charges are transferred from the line memory 52 to the horizontal charge transfer section 54, a relatively long time tends to be taken to complete the transfer. Consequently, in the event that the length of the LM transfer period is restricted to be short, as the frequency of a driving pulse φLM becomes higher, the possibility becomes higher that charges remain on a charge transfer channel of a transfer origin after the end of a transfer operation. As a result, the quality of signals that are output from the solid-state imaging device 100 may be deteriorated. By controlling the transfer at timings as shown in FIG. 13, the LM transfer time period T24 which has a sufficient length can be secured. Even though the frequency of the driving pulse φLM is high, charges can be prevented from being left on the charge transfer channel of the transfer origin after the end of the transfer.

Incidentally, when the solid-state imaging device 100 is driven at such a timing that the LM transfer time period T24 and the vertical transfer time period T11 overlap each other as shown in FIG. 13, there is a possibility that signal charges which are output from the vertical charge transfer sections flow out into the horizontal charge transfer section 54 through the line memory 52 without any interruption. Should this happen, there is a fear that signal charges of an upstream-side row and signal charges of a downstream-side row which neighbors the upstream-side row are mixed with each other.

As shown in FIG. 13, in the event that the driving timings are determined so that the time t42 at which the LM transfer time period T24 ends is in the time period (between tv1 and tv2) during which the middle level potential VM is appearing at the electrode VLast (47) for the final charge transfer stages of the vertical charge transfer sections 130, as will be described below, signal charges which are output from the vertical charge transfer sections 130 can be prevented from flowing out into the horizontal charge transfer section 54 through the line memory 52 without any interruption.

Potential distributions and signal charge states of the respective electrodes and charge transfer channels at connecting portions among the final charge transfer stages of the vertical charge transfer sections 130, the line memory 52 and the horizontal charge transfer section 54 are as shown in FIG. 9.

While the low level potential VL is being applied to the electrode VLast (47) for the final charge transfer stages of the vertical charge transfer sections 130 during the LM transfer time period T24 shown in FIG. 13, the potential barrier 90 is formed on charge transfer channels below the electrode VLast as shown in FIG. 9(a). Thereby, an upstream signal charge Qa is blocked by this potential barrier 90 and cannot flow out to the line memory 52 side. Consequently, there occurs no case where the upstream signal charge Qa and a downstream signal charge Qb are mixed with each other.

In addition, in the LM transfer time period T24 shown in FIG. 13, during the time period between the time tv1 and the time tv2, as shown in FIG. 9(b), the signal charges accumulated on the line memory 52 are transferred to the horizontal charge transfer channel 56 of the horizontal charge transfer section 54. In addition, since the potential barrier 90 is eliminated by the middle level potential VM that has been applied to the electrode VLast for the final charge transfer stages of the vertical charge transfer sections 130, the following signal charge Qa that appears on the upstream side moves to the charge transfer channels below the electrode VLast.

However, since the low level potential VL is being applied to an electrode for the line memory 52 during a time period between the time tv1 and the time tv2, as shown in FIG. 9(b), the potential at the line memory 52 is low as compared with the electrode VLast, and the line memory 52 functions as a potential barrier against the signal charge Qa. Consequently, there occurs no case where the signal charge Qa which has flowed into the charge transfer channels lying below the electrode VLast for the final charge transfer stages of the vertical charge transfer sections 130 flow out to the horizontal charge transfer section 54 side through the line memory. Thus, there occurs no case where the upstream signal charge Qa and a downstream signal charge Qb are mixed with each other.

In addition, in the case where the time at which the LM transfer time period T24 ends is changed to a time on or after the time tv2, since the potential below the electrode VLast becomes lower than the potential of the line memory 52, the signal charge Qa which has flowed into the charge transfer channels lying below the electrode VLast comes to flow out to the horizontal charge transfer section 54 side through the line memory 52. Consequently, the control needs to be implemented at the timings shown in FIG. 13.

Thus, as has been described heretofore, since the horizontal blanking time period can be made shorter than that obtained by the technologies shown in FIG. 14, by driving the solid-state imaging device using the driving method according to the embodiments of the invention, a fast readout of signal charges is achieved, to thereby make it possible to increase the frame rate.

In addition, a plurality of signal charges in positions adjacent to each other in the row direction can be prevented from being mixed with each other by restricting the timing at which the second transfer process ends based on the timing at which the potential for receiving and releasing the signal charges from upstream is applied to the electrode for the final charge transfer stages of the vertical charge transfer sections.

What is claimed is:

1. A method for driving a solid-state imaging device, wherein the solid-state imaging device comprises
   a photoelectric conversion section configured by arranging two-dimensionally a plurality of photoelectric conversion elements in a row direction and a column direction,
   a plurality of vertical transfer sections that transfer, in the column direction, signal charges output from the plurality of photoelectric conversion elements which are arranged in the column direction,
   a line memory provided at final charge transfer stages of the respective vertical transfer sections, the line memory that temporarily holds the signal charges, and
   a horizontal transfer section that transfers, in the row direction, the signal charges output from the line memory,
   the method comprising:
   performing a first transfer process of transferring the signal charges in the column direction on the vertical transfer sections, at a first timing;
   performing a second transfer process of transferring the signal charges output from the vertical transfer sections to the horizontal transfer section through the line memory, at a second timing;
   performing a third transfer process of transferring the signal charges in the row direction on the horizontal transfer section, at a third timing; and
   controlling the first to third timings so that at least a part of a second period during which the second transfer process is performed overlaps a first period during which the first transfer process is performed, wherein:
   the second transfer process is started before the first transfer process is started, and
   the second transfer process is completed before a first potential is applied to an electrode for the final charge transfer stages of the vertical transfer sections, the first potential for introducing the signal charges resulting from the first transfer process to the final charge transfer stages of the vertical transfer sections.

* * * * *